(12) United States Patent (10) Patent No.: US 11,825,144 B2
Smith et al. (45) Date of Patent: Nov. 21, 2023

(54) IN-BAND DATA RECOGNITION AND SYNCHRONIZATION SYSTEM

(71) Applicant: TiVo Solutions Inc., San Jose, CA (US)

(72) Inventors: Kevin P. Smith, Mountain View, CA (US); Paul Stevens, Felton, CA (US); Adam Feder, Mountain View, CA (US); James Barton, Los Gatos, CA (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

(21) Appl. No.: 17/214,210

(22) Filed: Mar. 26, 2021

(65) Prior Publication Data

US 2021/0217442 A1 Jul. 15, 2021

Related U.S. Application Data

(63) Continuation of application No. 16/188,494, filed on Nov. 13, 2018, now Pat. No. 10,991,394, which is a
(Continued)

(51) Int. Cl.
*H04N 21/41* (2011.01)
*H04N 21/236* (2011.01)
(Continued)

(52) U.S. Cl.
CPC ....... *H04N 21/41265* (2020.08); *G06F 18/00* (2023.01); *G11B 27/005* (2013.01); *G11B 27/10* (2013.01); *H04H 20/31* (2013.01); *H04H 60/73* (2013.01); *H04N 5/76* (2013.01); *H04N 21/236* (2013.01); *H04N 21/2353* (2013.01); *H04N 21/4135* (2013.01); *H04N 21/4147* (2013.01); *H04N 21/434* (2013.01); *H04N 21/435* (2013.01); *H04N 21/4312* (2013.01); *H04N 21/4314* (2013.01); *H04N 21/44008* (2013.01);
(Continued)

(58) Field of Classification Search
CPC ........... H04N 21/2353; H04N 21/4312; H04N 21/435; H04N 21/44008; H04N 21/458; H04N 21/4788; H04N 21/84; H04N 21/8456
See application file for complete search history.

(56) References Cited

U.S. PATENT DOCUMENTS 4,587,999 A * 5/1986 Boiko .................. B43K 7/03 401/176
4,697,209 A * 9/1987 Kiewit .................. G06V 20/40 725/19

(Continued)

*Primary Examiner* — James R Sheleheda
(74) *Attorney, Agent, or Firm* — HALEY GUILIANO LLP

(57) ABSTRACT

A method and apparatus for recognizing and synchronizing to in-band data at a multimedia device is provided. A content stream includes in-band data. The in-band data is processed and in-band data pattern data associated with the content stream are created. Metadata are attached to the event identification data. The event identification data are provided to multimedia devices which receive broadcasted multimedia content streams containing video programs with in-band data. The in-band data are processed and compared to the event identification data. If a match occurs, the multimedia device uses the metadata to perform specified actions.

20 Claims, 12 Drawing Sheets

Related U.S. Application Data continuation of application No. 14/818,278, filed on Aug. 4, 2015, now Pat. No. 10,153,000, which is a continuation of application No. 14/066,613, filed on Oct. 29, 2013, now Pat. No. 9,100,670, which is a continuation of application No. 12/572,037, filed on Oct. 1, 2009, now Pat. No. 8,572,669, which is a continuation of application No. 11/473,543, filed on Jun. 22, 2006, now Pat. No. 7,661,121.

(51) Int. Cl.

| | | |
|---|---|---|
| *G11B 27/00* | (2006.01) | |
| *G11B 27/10* | (2006.01) | |
| *H04N 21/434* | (2011.01) | |
| *H04H 20/31* | (2008.01) | |
| *H04H 60/73* | (2008.01) | |
| *H04N 5/76* | (2006.01) | |
| *H04N 21/4147* | (2011.01) | |
| *H04N 21/431* | (2011.01) | |
| *H04N 21/44* | (2011.01) | |
| *H04N 21/458* | (2011.01) | |
| *H04N 21/472* | (2011.01) | |
| *H04N 21/4788* | (2011.01) | |
| *H04N 21/84* | (2011.01) | |
| *H04N 21/845* | (2011.01) | |
| *G06F 18/00* | (2023.01) | |
| *H04N 21/235* | (2011.01) | |
| *H04N 21/435* | (2011.01) | |
| *H04H 60/13* | (2008.01) | |
| *H04H 60/27* | (2008.01) | |
| *H04N 5/765* | (2006.01) | |
| *H04N 5/85* | (2006.01) | |
| *H04N 5/907* | (2006.01) | |
| *H04N 9/82* | (2006.01) | |

(52) U.S. Cl.
CPC ....... *H04N 21/458* (2013.01); *H04N 21/4788* (2013.01); *H04N 21/47214* (2013.01); *H04N 21/84* (2013.01); *H04N 21/8456* (2013.01); *H04H 60/13* (2013.01); *H04H 60/27* (2013.01); *H04N 5/765* (2013.01); *H04N 5/85* (2013.01); *H04N 5/907* (2013.01); *H04N 9/8205* (2013.01)

(56) References Cited

U.S. PATENT DOCUMENTS

| | | | | |
|---|---|---|---|---|
| 4,739,398 A * | 4/1988 | Thomas | H04H 60/37 | 725/19 |
| 4,843,562 A * | 6/1989 | Kenyon | H04H 20/14 | 708/5 |
| 4,930,158 A * | 5/1990 | Vogel | H04N 7/162 | 386/253 |
| 5,374,951 A * | 12/1994 | Welsh | H04N 21/25891 | 379/92.04 |
| 5,892,536 A * | 4/1999 | Logan | H04H 20/106 | 725/86 |
| 6,008,802 A * | 12/1999 | Iki | H04N 7/0887 | 715/740 |
| 6,097,441 A * | 8/2000 | Allport | H04N 21/41265 | 348/E5.103 |
| 6,208,383 B1 * | 3/2001 | Park | G09G 5/246 | 348/723 |
| 6,473,778 B1 * | 10/2002 | Gibbon | G06F 40/103 | 715/201 |
| 6,637,032 B1 * | 10/2003 | Feinleib | H04N 21/435 | 348/E7.035 |
| 6,757,675 B2 * | 6/2004 | Aiken | G06F 16/325 | |
| 6,973,256 B1 * | 12/2005 | Dagtas | G11B 27/105 | 386/241 |
| 7,055,166 B1 * | 5/2006 | Logan | H04N 21/25891 | 725/115 |
| 7,661,121 B2 * | 2/2010 | Smith | H04N 21/4135 | 725/135 |
| 7,873,982 B2 * | 1/2011 | Smith | H04N 7/0885 | 725/135 |
| 8,086,491 B1 * | 12/2011 | Matz | G06Q 30/0269 | 705/14.66 |
| 8,146,130 B2 * | 3/2012 | Smith | H04N 21/4788 | 725/135 |
| 8,434,103 B2 * | 4/2013 | Tsuchida | H04N 21/25891 | 725/43 |
| 8,572,669 B2 * | 10/2013 | Smith | H04N 21/4147 | 725/135 |
| 9,100,670 B2 * | 8/2015 | Smith | H04N 21/8456 | |
| 9,106,949 B2 * | 8/2015 | Smith | H04N 5/782 | |
| 10,153,000 B2 * | 12/2018 | Smith | H04N 21/4312 | |
| 2002/0120925 A1 * | 8/2002 | Logan | A61Q 19/00 | 725/135 |
| 2002/0194595 A1 * | 12/2002 | Miller | H04N 21/4542 | 348/E7.083 |
| 2003/0120647 A1 * | 6/2003 | Aiken | G06F 16/325 | |
| 2003/0122966 A1 * | 7/2003 | Markman | H04N 21/47205 | 348/E7.071 |
| 2003/0182414 A1 * | 9/2003 | O'Neill | G06F 9/30021 | 717/170 |
| 2005/0100314 A1 * | 5/2005 | Huang | H04N 5/76 | 386/241 |
| 2005/0125551 A1 * | 6/2005 | Oh | H04L 63/1416 | 726/4 |
| 2006/0029363 A1 * | 2/2006 | Iggulden | H04N 7/002 | 386/326 |
| 2006/0080716 A1 * | 4/2006 | Nishikawa | H04N 21/472 | 386/E5.052 |
| 2007/0186246 A1 * | 8/2007 | Goldhor | H04N 5/76 | 725/135 |
| 2007/0300249 A1 * | 12/2007 | Smith | H04N 21/41265 | 725/19 |
| 2007/0300250 A1 * | 12/2007 | Smith | H04N 21/4348 | 725/135 |
| 2008/0212949 A1 * | 9/2008 | Wachtfogel | H04N 21/84 | 386/241 |
| 2010/0027976 A1 * | 2/2010 | Smith | H04N 21/2353 | 386/200 |
| 2010/0033624 A1 * | 2/2010 | Smith | H04N 21/458 | 348/461 |
| 2011/0110646 A1 * | 5/2011 | Smith | H04N 21/4147 | 386/E5.028 |
| 2012/0136965 A1 * | 5/2012 | Matz | H04N 21/4882 | 709/217 |
| 2012/0180083 A1 * | 7/2012 | Marcus | H04N 21/4532 | 725/32 |
| 2014/0059593 A1 * | 2/2014 | Smith | H04N 21/4147 | 725/32 |
| 2015/0271549 A1 * | 9/2015 | Ramaswamy | H04L 12/66 | 725/12 |
| 2016/0007099 A1 * | 1/2016 | Smith | H04N 21/235 | 725/32 |
| 2021/0217442 A1 * | 7/2021 | Smith | H04N 21/434 | |

* cited by examiner

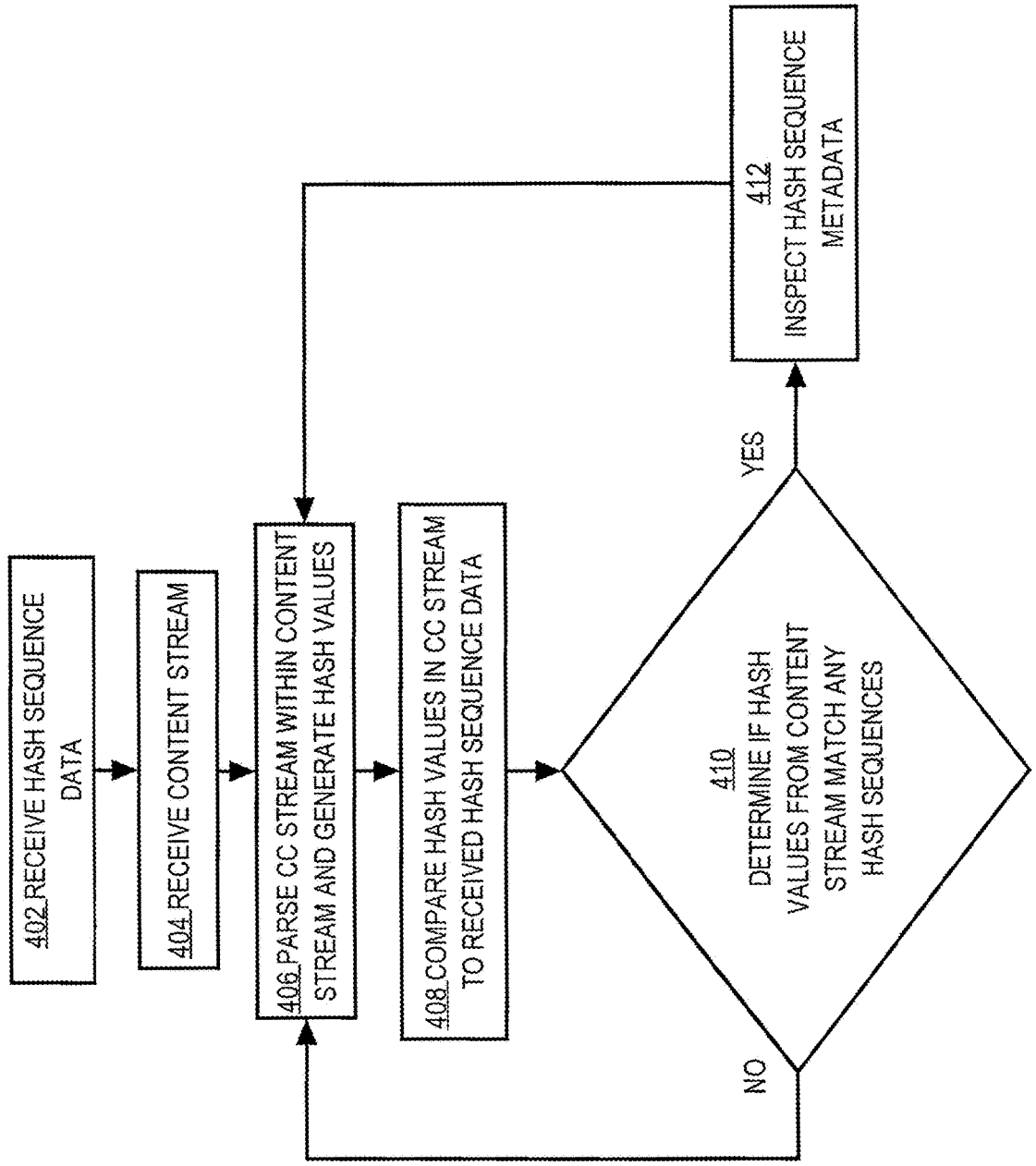

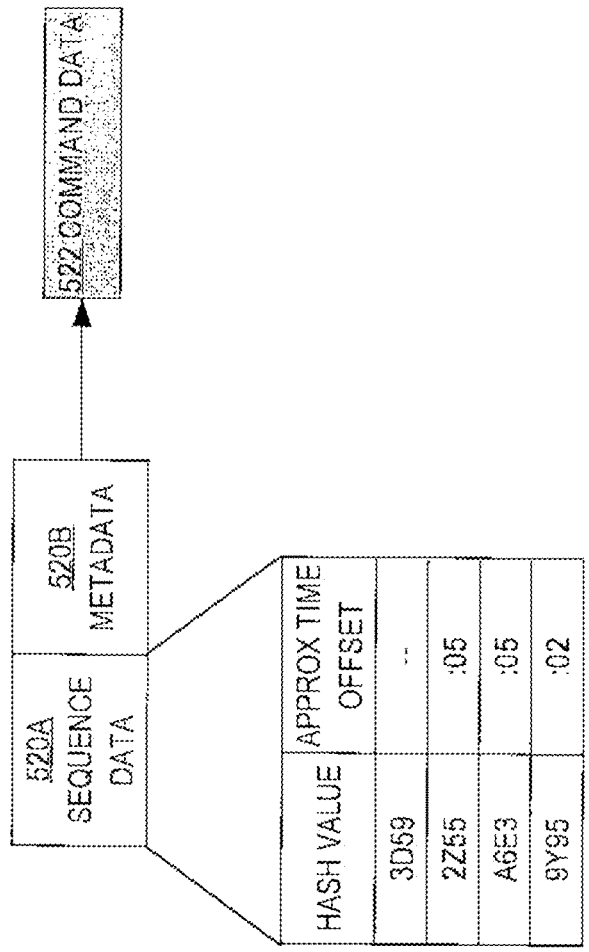

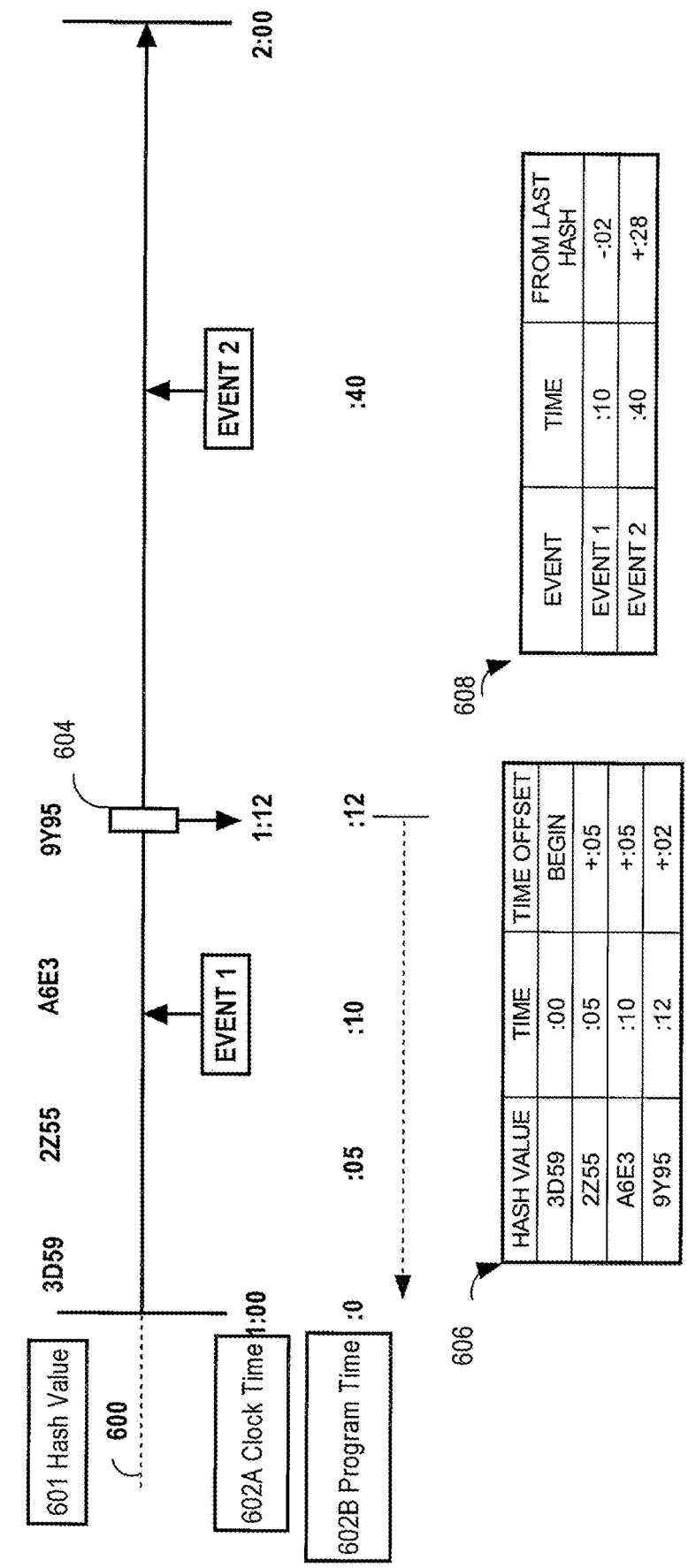

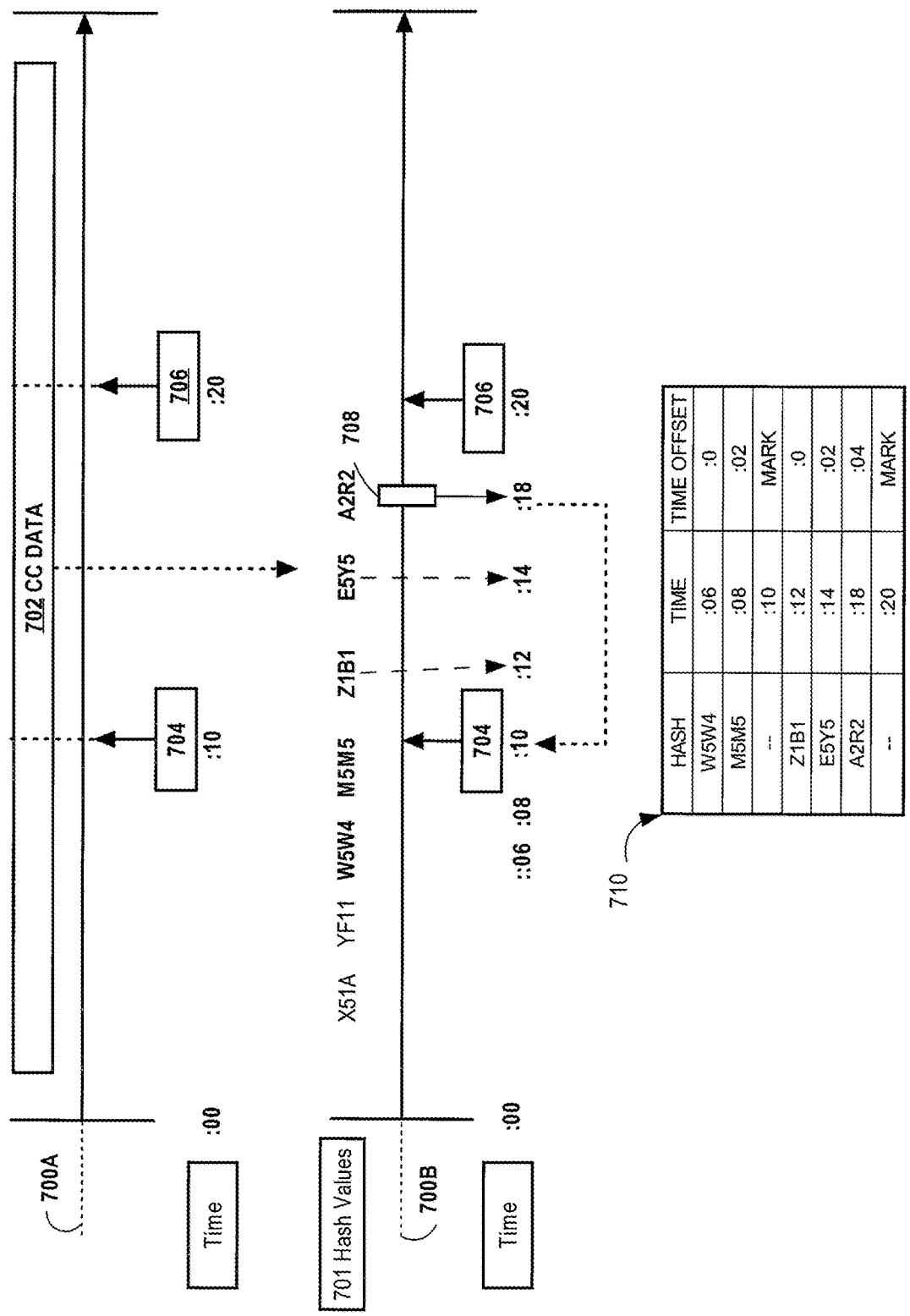

IN-BAND DATA RECOGNITION AND SYNCHRONIZATION SYSTEM

PRIORITY CLAIM; INCORPORATION BY REFERENCE

This application claims priority as a continuation of U.S. patent application Ser. No. 16/188,494, filed Nov. 13, 2018, which claims priority as a continuation of U.S. patent application Ser. No. 14/818,278, filed Aug. 4, 2015, now U.S. Pat. No. 10,153,000, which claims priority as a continuation of U.S. patent application Ser. No. 14/066,613, filed Oct. 29, 2013, now U.S. Pat. No. 9,100,670, which claims priority as a continuation of U.S. patent application Ser. No. 12/572,037, filed Oct. 1, 2009, now U.S. Pat. No. 8,572,669, which claims priority as a continuation of U.S. patent application Ser. No. 11/473,543, filed Jun. 22, 2006, now U.S. Pat. No. 7,661,121, the entire contents of which are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to recognizing in-band data in a multimedia content stream and locating points within the multimedia content stream at a multimedia device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

TV viewers can record broadcasted TV programs using a videocassette recorder (VCR). As such, a VCR user can record a particular TV program at the time it is broadcasted and play back the same recorded TV program at a later time. In order to accomplish this, a VCR changes the electrical signals representing a TV program into magnetic signals and stores the magnetic signals on a magnetic tape. The magnetic tape is usually in the form of a videocassette tape inserted into the VCR by the VCR user. When a VCR user decides to play back the TV program, the process is reversed, and the VCR changes the magnetic signals stored on the videocassette tape into electrical signals and sends the electrical signals to a TV set.

With the development of digital technology, VCRs are being replaced by digital video recorders (DVRs). A DVR records broadcasted TV programs for later playback by changing electrical signals of the TV program into digital information and storing the digital information on a hard drive. When a user plays back the recorded TV program, the DVR converts the digital information back to analog signals and sends the signals to the TV set which displays the TV program for the viewer. Also, with the advent of digital TVs, the DVR can receive digital and analog signals and send digital signals directly to a digital TV set which displays the TV program in digital form. Many content providers now use digital cable and satellite technology to broadcast digital programming. The digital programming is received by cable boxes and/or satellite transceivers which are used to display the digital programming to a user on a display screen. DVRs thus have the ability to receive digital programming signals from cable boxes or satellite transceivers for recording and display as well as being incorporated into such devices.

DVRs have become increasingly popular and widely used for recording TV programs. More importantly, the use of DVRs for recording TV programs has caused content providers to search for different means of presenting content to DVR users and enriching the experience of video programs. Customized broadcast content has been lacking in the content provider and DVR communities. U.S. patent application Ser. No. 09/665,921 owned by the Applicant, describes a method for tagging broadcast content using the closed caption area. U.S. Pat. No. 6,233,389, owned by the Applicant, also describes a method for recognizing specific words in the closed caption data. A technique for recognizing distinct events within an unmodified video program is desirable.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flowchart depicting a method for closed caption recognition and synchronization at a multimedia device according to an embodiment;

FIG. 5B is a block diagram illustrating hash value sequence data according to an embodiment;

FIG. 6 is a block diagram illustrating a method for synchronizing to in-band data according to an embodiment;

FIG. 7 is a block diagram illustrating a method for creating and viewing multimedia segments within a video program according to an embodiment.

DETAILED DESCRIPTION

Figure 1:
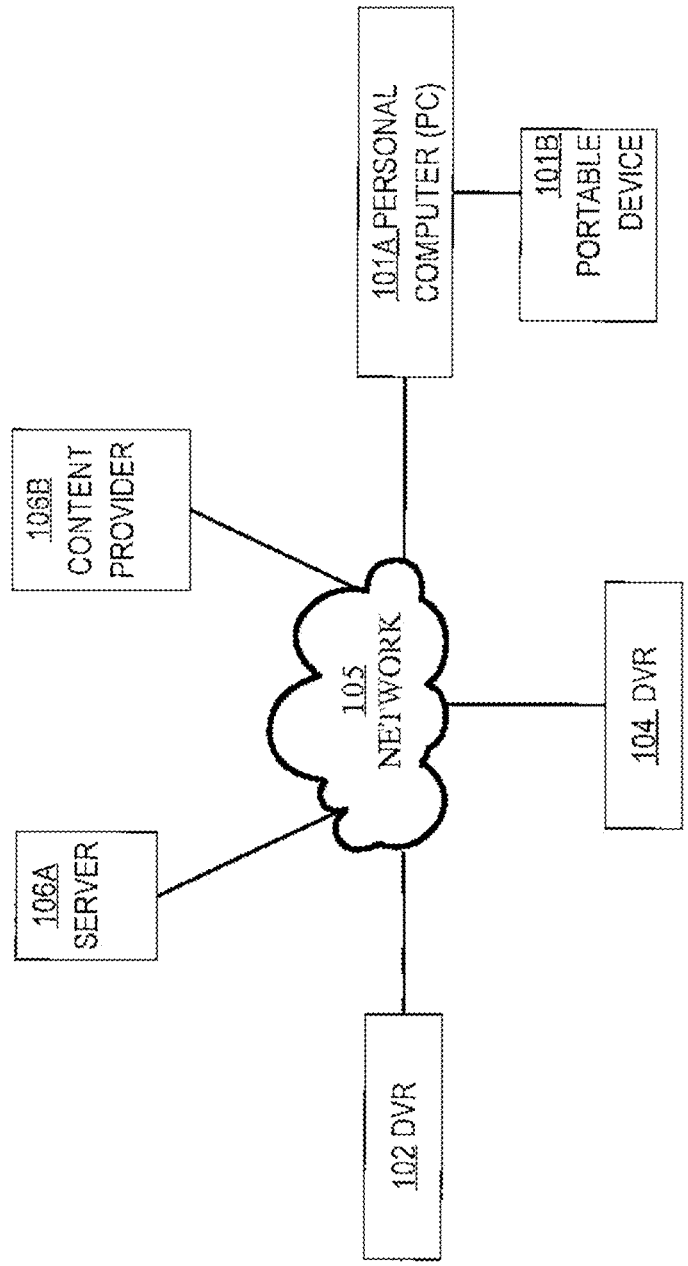
FIG. 1 is a block diagram illustrating a system for in-band data recognition and synchronization according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
- 1.0 General Overview
- 2.0 Structural Overview
- 3.0 Approach for Recognizing and Synchronizing to In-Band Data
  - 3.1 Closed Caption Data
    - 3.1.1 Generating Hash Value Sequence Data
    - 3.1.2 Hash Sequence Metadata
    - 3.1.3 Recognizing Hash Sequences at a Multimedia Device
    - 3.1.4 Synchronizing to Closed-Caption Data
  - 3.2 Enhanced Television Signaling Data
- 4.0 Approach for Creating and Viewing Customized Multimedia Segments
  - 4.1 User Selection of Multimedia Program Segments
  - 4.2 Creating User-Initiated Event Identification Data for Multimedia Programs
  - 4.3 Creating Tagged Multimedia Program Content
  - 4.4 Sharing Event Identification Data for Multimedia Programs
- 5.0 Implementation Mechanisms 1.0 General Overview The needs identified in the foregoing Background, and other needs and objects that will become apparent for the following description, are achieved in the present invention, which comprises, in one aspect, an in-band data recognition and synchronization system.

As mentioned above, the use of DVRs for recording TV programs has caused content providers to search for different means of presenting content to DVR users and enriching the experience of video programs. For example, content providers that desire to present additional marketing and promotional content within original video programs can have particular icons, messages or interactive elements be displayed to the user at particular parts of the video program.

As described in U.S. patent application Ser. No. 11/284,487 entitled "Method and Apparatus for Displaying Branded Video Tags," owned by the Applicant and fully incorporated by reference herein, a DVR may display branded portions of video programs by displaying icons or related content during the broadcast of the video program. Thus, if a content provider wanted to promote an upcoming video program, an interactive icon can be displayed during the display of a commercial detailing an upcoming video program. While viewing the commercial, viewers can interact with the icon using a remote control to cause the DVR to automatically record the promoted upcoming video program.

In order for many of these additional features to work, a DVR must synchronize with the multimedia content stream in order to display the additional content data at the correct time. Typically, the additional content is embedded directly into the multimedia content stream before the content is broadcasted. This way, the DVR processes the additional content along with the audio and video data within the multimedia content stream. By embedding the content directly into the multimedia content stream, the content provider is ensured that the additional data is presented to the user precisely where the content provider requested it to display. Further, the multimedia content stream may be embedded with additional information not visible to the user to assist the DVR in synchronization. The above features are described in further detail in U.S. application Ser. No. 09/665,921 entitled "Closed-Caption Tagging System," and U.S. Pat. No. 6,215,526 entitled "Analog Video Tagging and Encoding System," each of which is owned by the applicant and each fully incorporated by reference herein.

An embodiment of the invention allows for DVRs and other multimedia devices to synchronize to in-band data within multimedia content streams. In-band data is used for signaling additional data over the same channel or "band" as the one used to send data, in this case the audio and video data. One advantage of using in-band data for synchronization is that in-band data is normally left intact within content streams. Hence, because it is usually left intact and unchanged, in-band data is a reliable source for synchronizing to a multimedia content stream.

Examples of in-band data include closed-caption data and Enhanced Television (ETV) signaling data. Closed-caption streams contain closed-caption data (typically closed caption command data and text) associated with video programs such as commercials, sitcom programs, feature-length movies and other multimedia content for display to a viewer. ETV signaling data defines command and control signals for interactive applications which are synchronized to ETV video programs.

When a multimedia device receives a multimedia content stream containing video programs and in-band data, the device processes the in-band data. The multimedia content stream may be broadcast over the air by a content provider or have been previously recorded by the multimedia device. During the recording or playback of the video programs, the multimedia device attempts to recognize in-band data patterns. The in-band data patterns may be provided from another device or service provider as event identification data. The event identification data identifies in-band data patterns that are associated with particular events in the multimedia content stream. The event identification data may be stored on a storage device and accessed when processing in-band data.

The multimedia device attempts to recognize in-band data patterns by utilizing a matching algorithm. According to one embodiment, the matching algorithm is embodied in a finite state machine. While listening for in-band data within a multimedia content stream, the multimedia device utilizes the state machine to determine if the in-band data matches a particular pattern of in-band data.

According to one embodiment, event identification data, which is stored locally at the multimedia device, also includes metadata. The metadata specifies one or more actions to take in response to identifying the pattern by listening to the in-band data of a multimedia content stream. If a match occurs, the multimedia device processes metadata associated with the pattern and performs the appropriate action as specified in the metadata. For example, the multimedia device can display an icon to a user on a display screen. The metadata can instruct the multimedia device as to any response necessary if a user reacts to the icon. Further, in response to recognizing an in-band data pattern, the multimedia device can store video segments associated with the pattern in a storage device. The multimedia device can also use the metadata associated with the recognized pattern to determine where a video segment begins, ends, or where a particular event occurs within the video program. In this manner, a method for recognizing and synchronizing to an in-band data is enabled.

In another aspect, what is provided is a method for creating and viewing customized multimedia segments. Users at multimedia devices are provided a method by which they can select events or portions within a video program for storage or playback. At a first multimedia device, a user selects one or more locations within a video program using a control interface such as a remote control. A multimedia device receives signals from the control interface and determines which locations in the video program were selected. The multimedia device then computes an in-band data pattern relating to the selected location(s) and stores the in-band data pattern as event identification data in the same manner as described above.

The event identification data relating to the selected location(s) may be provided to another multimedia device. Using the event identification data, the other multimedia device attempts to match in-band data patterns associated with the video program to recognize the location(s) within the video program.

According to one embodiment, the selected location(s) of the video program represent an event or video segment. Further, according to another embodiment, when the video segment is recognized, video tags may be placed into the appropriate places within the multimedia content stream so that a user can skip directly to the location during playback of the video program.

Further, in other embodiments, once video tags representing the selected locations of the video program have been generated, the closed-caption data may be removed from the content stream, and the content stream may be provided to a portable device. The portable device uses the video tags to indicate the particular location or segments within the video program. Alternatively, instead of placing video tags into the multimedia content stream, an unedited version of the content stream may be provided to the multimedia device along with data representing the selected location(s). The data representing the selected location(s) may be provided separately from the multimedia content stream. A portable device may use the data to identify interesting locations within a video program and display the locations to a user. Alternatively, the portable device may use the data representing the selected location(s) in any appropriate manner.

In other aspects, the invention encompasses an apparatus and computer-readable medium.

2.0 Structural Overview

Throughout the present description, a number of terms will be used to refer to particular concepts, the definitions of which are provided herein. Specifically, "in-band data" is signaling data sent over the same channel or "band" as the one used to send audio and/or video data. Collectively, the in-band data is contained in an "in-band data stream." According to one embodiment, the in-band data stream may include closed-caption data or Enhanced Television (ETV) signaling data in a multimedia content stream. "In-band data patterns" includes any in-band data occurring over a particular segment of the in-band data stream. An in-band data pattern identifies a sequence of in-band data selected from a portion of the in-band data stream. For example, the in-band data pattern may be a collection of closed-caption data or ETV signaling data spanning a particular segment of the in-band data stream. "Event identification data" is data identifying one or more in-band data patterns. Further, event identification data may also include additional data such as metadata describing events within the multimedia content stream, as well as command data for performing actions in response to recognizing in-band data patterns. The event identification data may be provided to multimedia devices, which use the event identification data to recognize in-band data in a multimedia content stream and locate points within the multimedia content stream.

Referring to FIG. 1, in accordance with one embodiment, a system for in-band data recognition and synchronization is shown. The system contains DVRs 102 and 104, which are each communicatively coupled to Network 105 through any proper communication interface, such as an Ethernet or wireless communications port. Further, the system includes Server 106A, Content Provider 106B, Personal Computer 101A and Portable Device 101B.

Personal Computer 101A may be a personal computing device such as a desktop or laptop computer, and is also coupled to Network 105 through any proper interface. Personal Computer 101A is also connected to Portable Device 101B. Portable Device 101B is a handheld computing device, cellular phone, portable media player, or any other portable device capable of displaying multimedia content. Through Network 105, DVRs 102 and 104, Personal Computer 101A, and Portable Device 101B each communicate with Server 106A and Content Provider 106B.

The Network 105 may be implemented by any medium or mechanism that provides for the exchange of data between devices in the communication system. Examples of Network 105 include, without limitation, a network such as a Local Area Network (LAN), Wide Area Network (WAN), Ethernet or the Internet, or one or more terrestrial, satellite or wireless links. Alternatively or in addition, any number of devices connected to Network 105 may also be directly connected to each other through a communications link.

In one embodiment, DVRs 102 and 104 communicate with Server 106A, which provides program guide data, graphical resources (such as fonts, pictures, etc.), service information, software, advertisements, event identification data, and other forms of data that enable DVRs 102 and 104 to operate independently of the Server 106A to satisfy viewer interests.

Content Provider 106B may also provide multimedia program content directly to DVRs 102 and 104 through over the air broadcasts, satellite transmissions, or coaxial cable. The multimedia program content includes such content as feature length movies, sitcoms, variety shows, talk shows, advertisements, etc., for display to DVR users. Further, Content Provider 106B also provides additional data to Server 106A including promotional data, icons, web data, and other information for Server 106A to interpret and provide to DVRs 102 and 104. According to another embodiment, a Content Provider 106B also provides multimedia program content to Server 106A for processing. Server 106A processes the multimedia program content, creates the event identification data, and provides the event identification data to DVRs and other devices.

Figure 2:
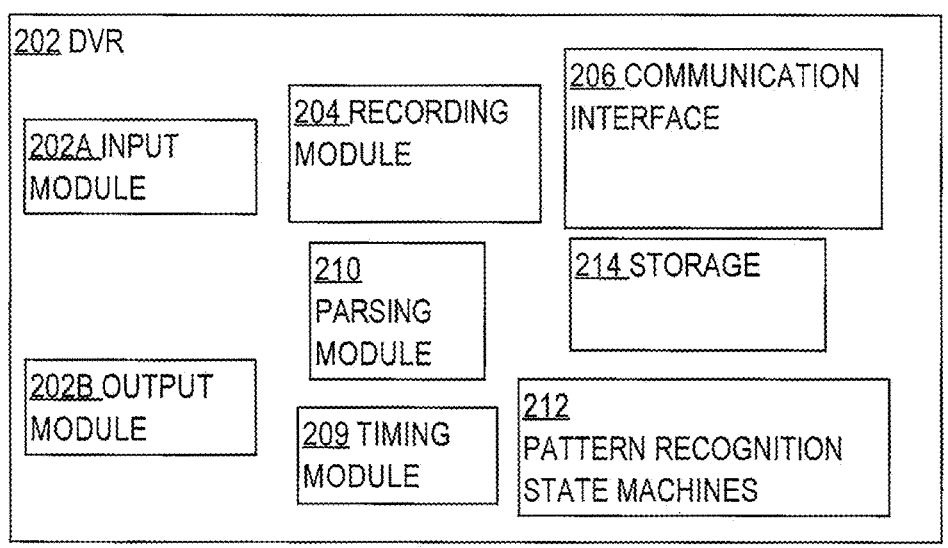
FIG. 2 is a block diagram illustrating a general overview of components of a device for in-band data recognition and synchronization according to an embodiment.

Multimedia devices use the event identification data to recognize and synchronize to multimedia content streams. Referring now to FIG. 2, a block diagram illustrating the components of a device for in-band data recognition and synchronization is shown according to one embodiment. In particular, FIG. 2 depicts the components of a DVR 200. Note that for purposes of example, reference will be made to a DVR throughout the description. However, the invention is not so limited, and the process of recognizing and synchronizing to in-band data may be implemented on any type of multimedia device or computer system.

DVR 200 generally comprises a plurality of components, signified by Input Module 202A, for receiving multimedia program content from Content Provider 106B or Server 106A. According to one embodiment, broadcast signals representing a multimedia content stream are sent to DVR 200 from Content Provider 106B. DVR 200 receives the broadcast signals representing a multimedia content stream from an antenna, a cable TV system, satellite receiver or any other transmission system via Input Module 202A. Input Module 202A may comprise a plurality of tuning modules that allow a plurality of signals to be received and recorded simultaneously. Further, Input Module 202A takes TV input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). DBS, DSS and ATSC are based on standards called Moving Pictures Experts Group 2 (MPEG2) and MPEG 2 Transport. MPEG2 Transport is a standard for formatting the digital data stream from the TV source transmitter so that a TV receiver can disassemble the input stream to find programs in the multiplexed signal.

DVR 200 also includes a Recording Module 204, which is functional for recording one or more portions of a multimedia content stream received from Input Module 202A and storing the multimedia content stream as a digital data stream in Storage Device 214. Recording Module 204 records the incoming multimedia content stream by storing the digital data stream on at least one storage facility such as Storage Device 214, which is designed to retain segments of the digital data stream. According to one embodiment, Storage Device 214 may be a hard disk drive located on DVR 200. Alternatively, Storage Device 214 may be any type of volatile and/or non-volatile storage medium, such as flash memory, and may also consist of removable storage media such as a DVD-ROM disc. Note that DVR 200 may contain multiple storage devices, storage mediums or removable storage media of the type described above in any combination thereof.

During playback, the digital data stream is converted into an analog signal, and then modulated onto an RF carrier, via Output Module 202B through which the signal is delivered to a standard TV set. Output Module 202B may alternatively deliver a digital signal to a TV set or video monitor. For example, DVR 200 may utilize a Digital Visual Interface port (DVI) for sending digital signals to a TV via a DVI cable. Alternatively, Output Module 202B may deliver analog and/or digital signals internally to a TV set without the use of any cables. For instance, DVR 200 may be part of a TV set, such that communication between the DVR 200 and the display screen is done internally via a system bus located on the TV set.

In order to record and store multimedia content streams, as well as other types of data, DVR 200 includes a Storage Device 214. Storage Device 214 may be a hard drive, memory, or any other form of storage located on DVR 200. Storage Device 214 may be used to store not only program material or multimedia content streams, but also additional data for use by DVR 200. For instance, event identification data may be stored in Storage Device 214 for future retrieval. Although Storage Device 214 appears as a module within DVR 200, Storage Device 214 may alternatively be located outside DVR 200, and DVR 200 may communicate with storage using an interface such as Communication Interface 206.

DVR 200 also includes a Communication Interface 206, through which the DVR 200 communicates with Network 105 via Ethernet, wireless network, modem or other communications standards. In other embodiments, Communication Interface 206 may be any type of communications port, such as a coaxial cable, infra-red, fiber optic or serial port. According to one example, data is communicated from Server 106A over Network 105 to DVR 200 using an Ethernet cable connected to Communication Interface 206. Using Communication Interface 206, DVR 200 may communicate with a PC 101A or Portable Device 101B through a LAN.

Input Module 202A receives multimedia content streams for recording and playback to DVR users. When multimedia content streams are received at Input Module 202A, they are recorded by Recording Module 204 and processed for display to the user via Output Module 202B. Processing of the multimedia content stream for display includes sending the multimedia content stream to Storage Device 214 and subsequently to Output Module 202B for display. In effect, the DVR records portions of the multimedia content streams during live playback, allowing a user to pause and rewind a live broadcast without recording the entire video program. The processing of the multimedia content stream is further described in more detail in U.S. Pat. No. 6,233,389 entitled "Multimedia Time Warping System" (hereinafter the '389 patent) owned by the Applicant and fully incorporated by reference herein.

During operation of DVR 200, Parsing Module 210 listens for in-band data, such as closed-caption data or ETV signaling data. While the multimedia content stream is being recorded, Parsing Module 210 monitors the in-band data portion of the stream. Alternatively, Parsing Module 210 may monitor the in-band data during any other time, such as the playback of the multimedia content stream.

According to one embodiment, the multimedia content stream is an MPEG transport stream, and the in-band data is interleaved with audio and video data as a private data event. Because the in-band data is a discrete event within the content stream, it is easily recognized by a multimedia device such as DVR 200. Further, in the case where the original broadcast is in analog format, DVR 200 contains a plurality of components necessary for digitizing multimedia content streams at Input Module 202A such that the multimedia content stream will be in the form of an MPEG Transport stream when processed by Parsing Module 210. The in-band data is extracted as the video and audio is placed in a packetized elementary stream (PES) as further described in the '389 patent. The in-band data is then later combined with the audio and video for processing by Parsing Module 210 and for display by Output Module 202B.

In order to synchronize with multimedia content streams, DVR 200 also contains a Pattern Recognition State Machine 212. In one embodiment, Pattern Recognition State Machine 212 represents an algorithm for recognizing in-band data patterns within the multimedia content stream. The Pattern Recognition State Machine 212 processes the event identification data, which includes known in-band data patterns, in an attempt to match the in-band data with known in-band data patterns.

According to one embodiment, the Pattern Recognition State Machine 212 is a state-based algorithm that attempts to match in-band data from Parsing Module 210 with in-band data patterns in the event identification data stored in Storage Device 214. If a match occurs, the Pattern Recognition State Machine 212 reports the match to the DVR 200, which inspects metadata associated with the recognized in-band data pattern. Based on the metadata, DVR 200 may perform any number of actions in synchronization with the multimedia content stream.

Note that although the components of DVR 200 have been described with relationship to a DVR, the above modules may be integrated into a TV system such that the modules are housed in a TV set capable of performing the functions of each module of DVR 200. Further, in other embodiments, the modules described above may be located among any number of devices capable of performing the described functions. Thus, through the operation of the described components, DVR 200 can recognize in-band data and synchronize actions and events to the in-band data.

3.0 Approach for Recognizing and Synchronizing to In-Band Data

As mentioned above, in-band data may take many forms. Two such forms include closed-caption data and ETV signaling data. Note, however, that the invention is not limited to closed-caption and ETV signaling data, and may be applied to other types of in-band data.

3.1 Closed Caption Data

One type of in-band data within a multimedia content stream is closed-caption data. Closed-caption data is data representing closed-caption text for display to a user, as well as closed-caption control in conjunction with video programming. Multimedia devices may recognize closed-caption data and synchronize actions and events to the closed-caption data in various ways using the processes as described herein.

A multimedia device may use closed-caption data patterns to recognize and synchronize to multimedia content streams. The types of data patterns available in closed-caption data are numerous. For instance, distinct data patterns may exist within the actual closed-caption text, the closed-caption control data, as well as well as any other event defined by the closed-caption data. By recognizing distinct patterns within the closed-caption data, a DVR may identify events within the multimedia content stream.

One way of recognizing patterns within closed-caption data is by computing hash values representing closed-caption text and identifying patterns of hash value sequences. Thus, according to one embodiment, at a multimedia device, such as a DVR or server, the closed-caption data is parsed and hash values are generated corresponding to the closed-caption data. The hash values are then compiled into hash value sequences associated with particular video programs or segments, and further combined with metadata defining command and control information for processing at multimedia devices.

These hash sequences and metadata are provided to multimedia devices such as DVRs in the form of hash value sequence data. The multimedia devices use the hash value sequence data for recognizing and synchronizing to closed-caption data. A matching algorithm is used by the multimedia device to sequentially compare generated hash values from the closed caption data with multiple hash sequences that the multimedia device has stored locally. According to one embodiment, the matching algorithm is implemented through a state machine that processes the generated hash values and reports whether or not a match has occurred with a hash sequence identified by the hash value sequence data.

3.1.1 Generating Hash Value Sequence Data

According to one embodiment, in order to recognize closed caption data and synchronize actions and events to the closed caption data in a computer system, hash value sequence data is generated and provided to devices such as DVRs 102 and 104. Each DVR 102 and 104 also receives one or more multimedia content streams containing video programs for display to a user. As defined herein, a video program may be a feature length movie, variety show, talk show, music video, sitcom program, commercial, live television broadcast, or any other multimedia content played to a user of a DVR.

The closed caption data, according to one embodiment, may be contained in a separate stream of data associated with the multimedia content stream. For instance, if a program is in digital form, the closed caption data is communicated within an MPEG2 stream as part of a private data channel. However, when communicated in an analog format, closed caption data is instead modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). However, analog closed-caption signals are decoded by the input module of the DVR and passed to the other components of the DVR as if they were delivered via an MPEG2 private data channel. Therefore, as described above, Parsing Module 210 of DVR 200 can process the closed-caption data which originally broadcast in either analog or digital form. More information regarding the location of closed caption data in multimedia content streams can be found in U.S. application Ser. No. 09/665,921, entitled "Closed-Caption Tagging System," owned by the Applicant and fully incorporated by reference herein.

In other embodiments, the closed caption data may be contained in any detectable form within the multimedia content stream. Server 106A and DVR 200 can read and parse the closed caption data.

As part of the process of recognizing closed caption data and synchronizing actions and events to the closed caption data in a multimedia content stream, each DVR 102 and 104 also receives event identification data. According to one embodiment, the event identification data is hash value sequence data. The hash value sequence data may come from a number of sources such as Server 106A. For example, Server 106A may pre-process program content by computing hash values and determining hash sequences for use by multimedia devices. The program content may be provided by Content Provider 106B to Server 106A before it is ever broadcasted to multimedia devices. In this manner, Server 106A may provide hash sequences to multimedia devices before the multimedia devices receive the associated program content. Alternatively, the sequence data may come from another computing device such as another DVR.

Figure 3A:
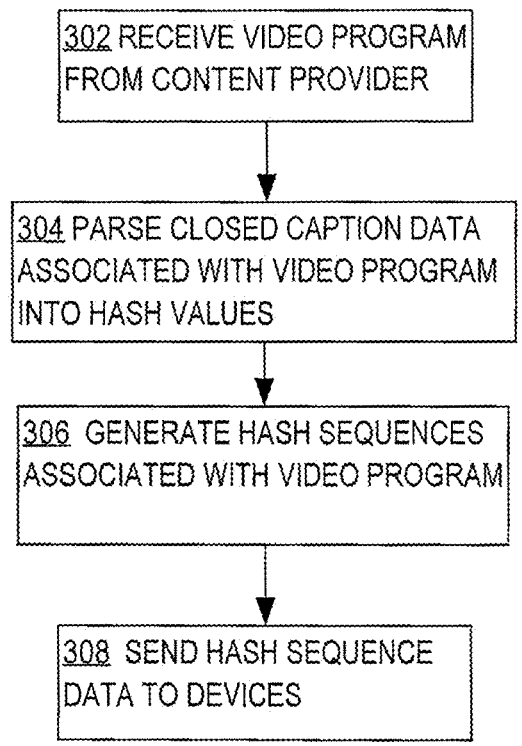
FIG. 3A is a flowchart depicting a method for generating hash value sequence data according to an embodiment.

Therefore, referring now to FIG. 3A, a flow diagram depicting a method for generating hash value sequence data according to one embodiment is shown. At step 302, Server 106A receives data representing one or more video programs from Content Provider 106B. The data may be in the form of a multimedia content stream or may be individual video program data separated from the multimedia content stream. Along with the video program data, Content Provider 106B also supplies closed caption data associated with the video program to Server 106A. In one embodiment, the closed caption data may be embedded within a multimedia content stream containing the video program supplied by Content Provider 106B. Further, Content Provider 106B may provide metadata containing event information associated with video programs.

Server 106A defines information specifying events or actions that are operated upon by the multimedia device while displaying a video program to a user. This information may include references to graphical icons or additional content for display to the user. The content or icons would be present on the multimedia device or obtainable by the device via the Internet, network, or other DVRs. Further, the information may present data representing certain events within the video program. For instance, if a sports broadcast were split up into separate periods and intermission, the Content Provider 106B could provide event information to Server 106A indicating where in the multimedia content stream the intermission occurs. Using this information, Server 106A can generate hash value sequence data to allow a DVR to automatically identify the beginning and ending of the intermission within the video program. Because the intermission has been identified, a DVR user may request the DVR to automatically skip over the intermission when viewing the recorded broadcast.

Further, according to one embodiment, Server 106A may obtain closed-caption data for video programs from any multimedia device, such as a DVR. For instance, DVR 102 may have previously recorded a video program containing closed caption data. DVR 102 can send the recorded video program to Server 106A over Network 105, including the closed caption data associated with the video program, for processing by Server 106A.

At step 304, Server 106A parses the closed caption data of the video program into hash values, which are used to create hash value sequence data. Server 106A may use a number of different methods to create hash values. The method used to create hash values for closed caption data may vary according to the method used by the closed captioning stream to display closed captioning text to a viewer of the video program.

Thus, Server 106A keeps track of what closed captioning mode is being used to display the closed caption data. For instance, according to one embodiment, closed captioning text may be processed and displayed to a user using Pop-Up mode, Roll-Up mode or Paint-On mode as further described herein. Depending on the mode used, a hash value represents the result of applying a hash function to a number of characters in a line of text. A hash function H is a transformation that takes a variable-size input m and returns a fixed-size string, which is called the hash value h, that is $h=H(m)$. The variable size input for closed-caption data will depend on the closed-caption method being used as further described herein. Further, according to one embodiment, the amount of characters that may be placed in a line of closed-caption data is limited.

However, Parser 312 may be configured to accept any number of characters in a line of text in order to accommodate different systems. Thus, as described below, Parser 312 determines when to generate hash values in response to detecting discrete events within the closed-caption data. The discrete events within the closed caption data may be commands such as a "carriage return" command. A "carriage return" command may be used to define the end or beginning of a line of text. Thus, for example, when a line of text has been completed, a "carriage return" will cause the cursor position to reset to the next line.

The hash function is useful for creating a standardized hash value out of varying sizes of text. According to one embodiment, the characters may represent hexadecimal numbers similar to those defined by the American Standard Code for Information Interchange (ASCII). Further, some closed-captioning implementations may utilize a modified ASCII standard for the display alternative symbols, such as musical notes during audio in a video program.

According to one embodiment, Parsing Module 210 applies the hashing algorithm to the hexadecimal representations of the closed caption data in order to produce hash values. Further, Parsing Module 210 adjusts the method for computing hash values depending on the closed-captioning method being used.

Figure 3B:
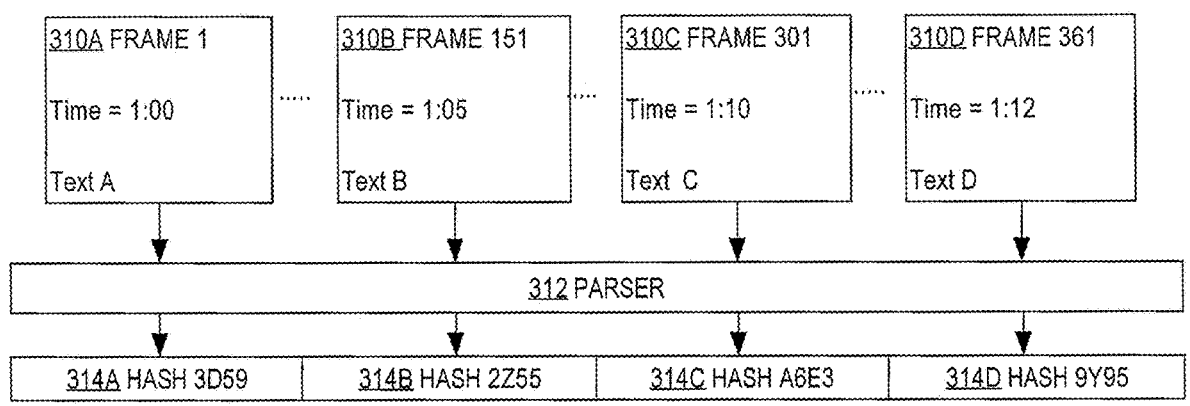
FIG. 3B is a block diagram illustrating the method for generating hash value sequence data according to an embodiment.

Referring to FIG. 3B, a block diagram illustrating the method for generating hash value sequence data according to one embodiment is shown. Frames 310A-310D represent frames of a video program within a multimedia content stream received at Server 106A. According to one embodiment, video programs are played back at a rate of thirty frames per second. Each frame 310A-310D is displayed at a particular time according to the frame rate. For instance, frame 310A occurs at time=1:00 and frame 310B occurs at time=1:05. Hence, assuming a frame rate of thirty frames per seconds, frame 310B occurs at frame number 151, or 150 frames after frame 310A.

Note that frames 310A-310D are only four discrete frames among many frames within the multimedia content stream, and many frames may exist between each of frames 310A and 310D. At frames 310A-310D, hash values are generated for Text A-D, respectively. Text A-D is text contained within a closed caption stream, and frames 310A-310D represent the time at which hash values are generated for the text. Note, however, that closed-captioning text normally displays for more than one frame at a time. According to one embodiment, the transmission rate for closed-captioning data is two bytes per frame of video, and the transmission or reception of an entire line of text takes several frames. Text B, for example, may display on multiple frames preceding frame 310B. However, frame 310B is the position within the multimedia content stream at which a hash value is generated for Text B.

Further, because each frame 310A-310D is displayed at a particular time, metadata may be created which contains relative-time data representing a time within the video program or multimedia content stream that the frame is being displayed. Thus, frame 310A is displaying text A at time 1:00 while frame 310B is displaying text B at time 1:05. Parser 312 reads text A-D from each frame 310A-310D in order to generate hash values 314A-314D and metadata associated with those hash values, respectively. However, note that metadata need not be created each time a hash value is generated.

In other embodiments, additional frames not displaying any text may be parsed by Parser 312. However, because those frames contain no closed-captioning text, the generation of a hash value will not be triggered. Rather, as described in further detail herein, Parser 312 does not generate a hash value until a triggering event has occurred. Depending on the closed-captioning method being used, the triggering event will vary from case to case. For instance, according to one embodiment, the triggering event is the identification of a "carriage return" command within the closed-caption data. When the "carriage return" command is detected within the closed-caption data, Parser 312 generates a hash value representing the one or more lines of closed-captioning text spanning a number of seconds within the video program.

Table 320 represents a listing of hash values generated by Parser 312 from the video program represented by frames 310A-310D. Table 320 includes a Hash Value column, a Time column and a Time Offset column. The Hash Value column represents the hash values generated by Parser 312 for frames 310A-310D. The Time column represents the relative time that each hash value was generated according to the appropriate closed-caption method. The time value may be relative to the entire multimedia content stream, the particular video program containing frames 310A-310D or a real-world clock time of the DVR.

When Parser 312 generates a hash value for any frame, Parser 312 queries a Timing Module 209 of DVR 200 to determine the time at which the hash value was generated. As long as Parser 312 uses the same relative time unit for generating the time in the Time column, DVR 200 can accurately track any time variances between generated hash values and hash value sequence data. The Time Offset column indicates the difference between the time data associated with one hash value and the time data associated with a subsequent hash value. For example, hash value "3D59" is reported to have no time offset value. In this case, it is determined that hash value "3D59" is the beginning of a hash sequence, thus, no time offset value is needed. However, for hash value "2Z55", a time offset value of :05 seconds is reported, which indicates that hash value "2Z55" is generated approximately :05 seconds after hash value "3D59" has been generated. This information may be used to locate the beginning of a video program, or alternatively, any particular event or location within the video program at a DVR. The process of using the time offset information to synchronize a computer system to a video program is discussed in further detail below in section 3.3.

Thus, Parser 312 parses the closed-caption data within the video program. Referring back to FIG. 3A, once Parser 312 has parsed the closed caption data of a video program into hash values, Server 106A proceeds to generate hash sequences associated with the video program at step 306. When Parser 312 has completed generating a particular number of hash values for a video program or video program segment, Parser 312 creates hash value sequence data from the generated hash values.

The number of hash values in a hash sequence, as well as the amount of time represented by the hash values may be arbitrarily set by Parser 312, Server 106A, or any other device or user wishing to control the creation of hash value sequence data. For instance, if Content Provider 106B supplied a particular video program for parsing to Server 106A, Content Provider 106B may also indicate that during a particular portion of the video program lasting between five to ten seconds, an icon should appear on the screen requesting user input. FIG. 3D is a diagram illustrating such an icon appearing on a display screen according to one embodiment. According to FIG. 3D, display screen 400 shows an icon 404. The icon 404 contains dialog requesting user input 404A. In this example, Content Provider 106B requests to Server 106A that icon 404 should appear on display screen 400 during a particular portion of a video program. Here, Parser 312 can be configured to generate hash values spanning at least 10 seconds of the selected portion of the video program. This ensures that hash values are generated for at least the selected portion of the video program, giving a computer system enough time to recognize the full sequence of hash values and to positively identify the video program or portion. Further, to compensate for any delay or margin of error, Parser 312 can be configured to generate hash values spanning more than the selected portion of the video program.

Alternatively, the length of any hash value sequence data may be determined by how unique each hash value generated within the hash sequence is. For example, in some situations, the same closed-caption data may result in the same hash value. If two video programs contain very similar closed-caption data, such as two commercials with very little closed-caption text, they may initially generate the same hash values for the first portion of the program. However, the longer Parser 312 generates hash values for a particular video program, the more likely the hash sequence will be unique. Therefore, Parser 312 may be configured to select any number of hash values to include in a hash sequence in order to control the accuracy of matching hash value sequence data to video programs. Further, when Parser 312 generates the hash values, Server 106A can associate metadata with hash value sequence data. The associated metadata may indicate that an icon 400 be displayed requesting input from the user, as discussed in the example above.

When hash values are generated, Parser 312 includes time data associated with the time each hash value was generated. However, the same closed-caption data or even the same hash value may be generated at different times according to the closed-caption method used.

Figure 3C:
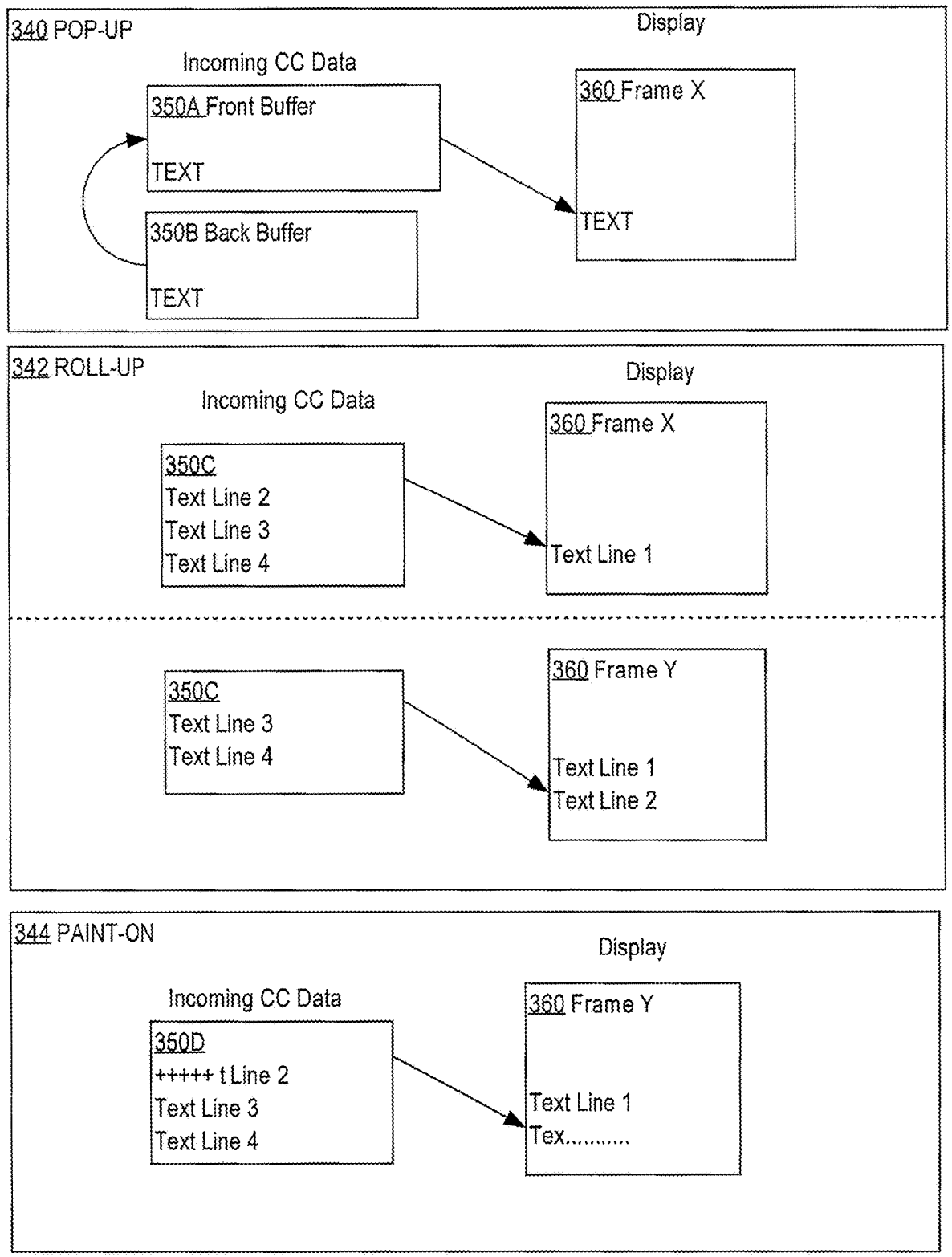
FIG. 3C is a block diagram illustrating the method for generating hash value sequence data using various closed-caption schemes according to an embodiment.
Figure 3D:
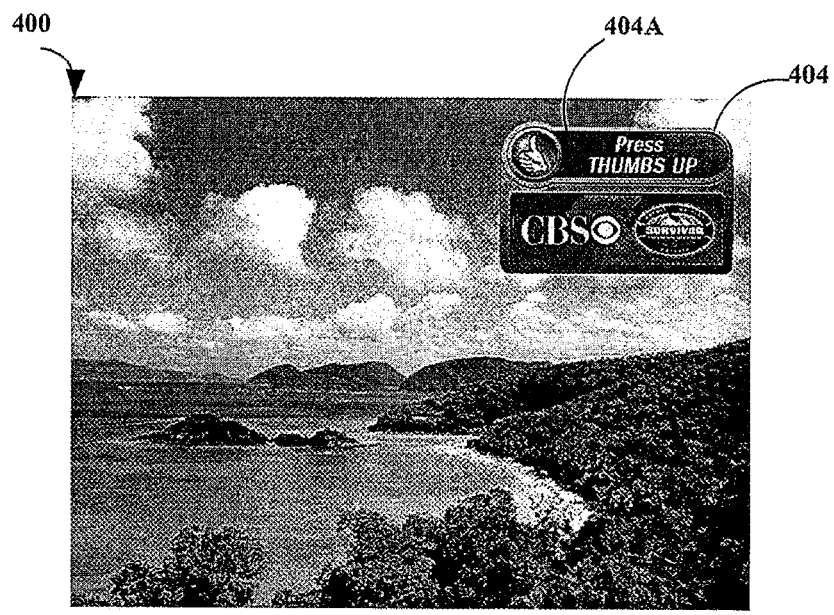
FIG. 3D is a block diagram illustrating an icon appearing on a display screen according to an embodiment.

Thus referring to FIG. 3C, different closed captioning methods are shown according to one embodiment. Respectively, closed-caption data is displayed to a user in Pop-Up Mode 340, Roll-Up Mode 342, or Paint-On Mode 346. FIG. 3C shows an incoming CC data area representing data from a closed-caption stream and a display area representing the output or actual display of closed caption text to a user.

3.1.1.1 Pop-Up Mode

In Pop-Up Mode 340, according to one embodiment, between one and four lines of text appear onscreen all at once, stay there for a period of time and are then replaced by the next lines of closed-caption text.

In Pop-Up Mode 340, incoming closed caption data is placed in Back Buffer 350B and displayed with a single "flip buffers" command once the complete text for a particular frame or series of frames is ready to be displayed. In this mode, a hash value is generated for the text being displayed when the "flip buffers" command is issued. When the "flip buffers" command is issued, the text in Back Buffer 350B is transferred to Front Buffer 350A, which represents the text being displayed on Display 360.

In Pop Up mode, there are only two well defined events that change the visible text on Display 360 to the user. These events include (1) the flipping of the buffers such that the contents of Back Buffer 350B are placed in the Front Buffer 350A, and (2) erasing the displayed text on display screen 360. Generating hash values in Pop-Up mode is merely a matter of keeping track of the text composed in the back buffer and creating a hash value for the text in Back Buffer 350B once a flip command or an erase displayed memory command has been processed.

Thus, in Pop-Up mode, Parser 312 will keep track of text being composed in Back Buffer 350B. While monitoring Back Buffer 350B, Parser 312 continues to update a hash value corresponding to the full value of any accumulated text in Back Buffer 350B. Initially, the Back Buffer 350B is empty. While text is being composed into each line, Parser 312 waits until a "cursor positioning" command is issued. A cursor positioning command may be used to place the text cursor onto a new line. Based on the cursor positioning command, Parser 312 may determine that a line is complete and computes a hash value for the particular line.

Eventually, Front Buffer 350A is cleared and Back Buffer 350B is flipped to the front by issuance of a flip buffers command. Note that Back Buffer 350B may contain multiple lines of text. In order to generate a single hash value for the multiple lines of text, a cumulative hash value is generated for all the lines of text appearing in Front Buffer 350A. The cumulative hash value is created once the Back Buffer 350B is flipped to the Front Buffer 350A. Thus, while text is being compiled in Back Buffer 350B, Parser 312 keeps track of the individual hash values for each line of text as described above. When flipped to Front Buffer 350A, the hash values for each line are combined together to create the cumulative hash value.

According to one embodiment, when Parser 312 generates the hash value, Parser 312 also retrieves time data associated with the multimedia content stream from Timing Module 209. Timing Module 209 may indicate the timing of the multimedia content stream relative to the beginning of the multimedia content stream, a calendar clock time, time since the last hash value, or the time relative to the start of a video program within the multimedia content stream. Hence, referring back to FIG. 3B, for example, Parser 312 determines that Text A of frame 310A has been flipped to Front Buffer 350A at Time=1:00 and has a corresponding hash value of "3D59".

3.1.1.2 Roll-Up Mode

Another mode for displaying closed-caption text is Roll-Up Mode 342. In Roll-Up Mode 342, which is more common in live broadcasts like news or talk shows, text is typed as it is spoken and appears on the television as soon as it is received. Once a "carriage return" command is received, the text scrolls up. A carriage return command is a command that causes the cursor to return to the beginning of the line. Because the cursor has returned to the beginning of a new line, a carriage return may be used to indicate that a new line is being composed. According to one embodiment, text may be initially composed on Display 360 such that frame X thus includes Text Line 1, while the incoming CC data 350C contains text that is subsequently composed such as Text Lines 2-4. When Text Line 2 is ready to be displayed, Text Line 2 "rolls-up" to the display, causing Text Line 1 to shift up in frame Y of Display 360. In one embodiment, frame Y allows only two lines of text at a time to be displayed. Thus, in any subsequent frames, when Text Line 3 is ready to be displayed, Text Line 1 would be deleted and Text Line 2 would move up occupying the second row of text on Display 360. Alternatively, any number of lines may be provisioned for closed captioning in roll-up mode.

According to one embodiment, in order to generate hash values in Roll-Up Mode, Parser 312 monitors the lines of text and listens for a carriage return command. Once Parser 312 determines that such an event has occurred, Parser 312 generates a hash value for the corresponding text. Thus, a hash value is generated when a line of text is complete, and the closed captioning data contains a discrete user visible event that marks the end of the line. As opposed to creating a cumulative hash value for all lines of text displayed on the screen, Roll-Up Mode generates and reports a hash value for each visible line of text as it appears on screen.

For instance, according to one embodiment, Parser 312 can determine that a line of text is complete when the text is scrolled up by one line, for example, Text Line 1 at frame Y. Parser 312 can detect that a line of text is complete when it detects a "carriage return" command within the incoming CC Data 350. Hence, referring back to FIG. 3B, for example, Parser 312 determines that a line of text corresponding to Text B is complete after detecting a "carriage return" command at frame 310B and computes a hash value of "2Z55" at Time=1:05.

3.1.1.3 Paint-On Mode

Another closed-captioning mode is Paint-On Mode 344. Paint-On Mode 344 is similar to Pop-Up Mode 340 except that the incoming CC data 350D is directly composed onto a front buffer, and since the contents of the front buffer are directly fed to the display, a viewer can see the text as it is being composed. In one embodiment, in order to generate hash values, Parser 312 waits until the first user-visible event occurs after a full line of text is complete. Thus, in Paint-On Mode 344, one method of generating hash values includes accumulating a line of text as it is being displayed, and waiting for the first user visible event after the line is complete to generate the hash value for that line. The first user-visible event might be the start of another line, clearing of the screen, or a "flip buffers" command to display new text in Pop-Up Mode.

3.1.2 Hash Sequence Metadata

Regardless of the type of closed captioning mode being used, once Parser 312 generates the hash values associated with a video program, the hash values are placed into Table 320 along with any additional data such as the time and time offset data for each hash value. The cumulative data in Table 320 thus represents hash value sequence data generated by a device such as Server 106A.

Once hash value sequence data has been generated, additional metadata may be associated with the hash sequence. According to one embodiment, the additional metadata may include command and control data for performing some action upon recognition of the hash sequence.

Thus, referring back to FIG. 3B, Table 330 includes columns representing hash sequences and metadata associated with the hash sequences. According to one embodiment, the hash sequence 3D59, 2Z55, A6E3, and 9Y95 includes metadata which describes an event EVENT 1. EVENT 1 may be an event within the multimedia content stream that occurs at a particular time. For instance, EVENT 1 may define a particular location within a video program, such as an intermission during a sporting event. The metadata defining EVENT 1 may also include additional information such as a description of the video program and subsequent actions to take after recognizing the event. For instance, EVENT 1 may include tag information for inserting a tag into the program stream at the time of EVENT 1. The tag is operational for allowing a user to browse directly to EVENT 1, or alternatively, skip over EVENT 1 during playback. The functionality of tags in the multimedia content stream is described in further detail below, and is also described in U.S. application Ser. No. 09/665,921, entitled "Closed Caption Tagging System," owned by the Applicant and fully incorporated by reference herein.

Still referring to Table 330, the metadata may also specify particular actions, such as ACTION 1 associated with hash sequence A6E3, 9Y95, E4E9 and 9F4U. According to one embodiment, ACTION 1 may describe a particular action for the DVR to take after recognizing the hash sequence. For example, ACTION 1 may include displaying an icon to a user of the DVR. The metadata defining ACTION 1 may include timing information relating to the length of the action, as well as information relating to graphics and icon placement on the display device connected to the DVR. Note that the action specified by the metadata may take place at a time different from the time of recognizing the hash sequence. For instance, the metadata may indicate that the action should take place at a time preceding the recognition of the hash sequence. In this manner, if the program is played back from storage, the DVR scans ahead, performing the hash comparisons, and knows to perform the action at the correct time.

In another embodiment, ACTION 1 may include command data for the DVR to process. The command data may cause DVR to record and store one or more portions of the multimedia content stream. For instance, during the live broadcast of a particular video program, if the DVR recognizes the hash sequence of C, D, E, F, and processes the command data associated with the hash sequence, the command data will cause the DVR to immediately begin recording the program. In other embodiments, the command data may cause the DVR to begin recording the live broadcast anytime after the recognition of the hash sequence.

Further, the metadata associated with any hash sequence is not limited to the specified events or actions, but may be any data that can be understood and processed by a DVR or device receiving the metadata.

3.1.3 Recognizing Hash Sequences at a Multimedia Device

When Server 106A has accumulated hash value sequence data, Server 106A sends the hash value sequence data to a DVR or other device, which uses the hash value sequence data to recognize closed caption data and to synchronize to video programs using the closed-caption data. Referring now to FIG. 4, a flowchart outlining the process of recognizing closed caption data and synchronizing actions and events to the closed caption data is shown. At step 402, DVR 102 receives the hash value sequence data represented by Table 330 in FIG. 3B from Server 106A. In one embodiment, in what is known as a "pull" transaction, DVR 102 receives the hash value sequence data after initiating a request for the hash value sequence data to Server 106A. Alternatively, in what is known as a "push" transaction, Server 106A may automatically send the hash value sequence data to DVR 102 without any request from the DVR 102. When DVR 102 receives the hash value sequence data, it stores the hash value sequence data in Storage Device 214.

At step 404, DVR 102 receives a multimedia content stream for display to a user. According to one embodiment, the multimedia content stream may be received from Input Module 202A and represent multimedia content currently being broadcast by Content Provider 106B. Alternatively, the multimedia content stream may be played back from Storage Device 214 of DVR 102. Further, in other embodiments, DVR 102 may receive a multimedia content stream via broadcast or the Internet without displaying the multimedia content stream to the user. Hence, DVR 102 can receive content from Content Provider 106B and store the content in Storage Device 214. While the multimedia content stream is being recorded or played back, at step 406, DVR 102 begins to parse closed-caption data associated with the multimedia content stream.

Parsing Module 210 parses the closed-caption data in the same manner as described above with reference to Server 106A in FIG. 3B. Thus, Parsing Module 210 parses the closed-caption data into multiple hash values according to the closed-captioning method used (i.e., Pop-Up, Roll-Up or Paint-On). While generating hash values, Parsing Module 210 sends the hash values and time stamps associated with each hash value to the Pattern Recognition State Machine 212, which is used to compare and match the hash values to any of the hash value sequence data downloaded, stored, or received by the DVR 102 from Server 106A or any other source At step 408, the Pattern Recognition State Machine 212 is used to monitor the hash values generated by Parsing Module 210 and compares the hash values to the hash value sequence data received at step 402. According to one embodiment, the Pattern Recognition State Machine 212 is a state machine constructed according to the hash value sequence data that was received at step 402.

For the purpose of example, assume that the Pattern Recognition State Machine 212 takes the structure of a tree containing nodes and branches. Each node in the tree may represent a particular hash value in a sequence of hash values, and each "branch" of the tree represents a full hash sequence identified by the hash value sequence data. This structure is further referenced in FIG. 5A, discussed below. The Pattern Recognition State Machine 212 attempts to match generated hash values by traversing the nodes of the tree. At any given node, if a match occurs, the Pattern Recognition State Machine 212 proceeds to the next node. If the earlier node represents the end of a hash value sequence, a match has occurred, and the Pattern Recognition State Machine 212 may indicate that a hash value sequence has been identified, in turn causing the DVR 200 to perform the appropriate action as described in further detail herein.

Accordingly, at step 510, the Pattern Recognition State Machine 212 determines if any hash values generated by Parsing Module 210 match hash values contained within the hash value sequence data. As long as the hash values match and the difference in time between the hash value events are within a threshold of the expected hash sequence, a positive match will be reported.

Figure 5A:
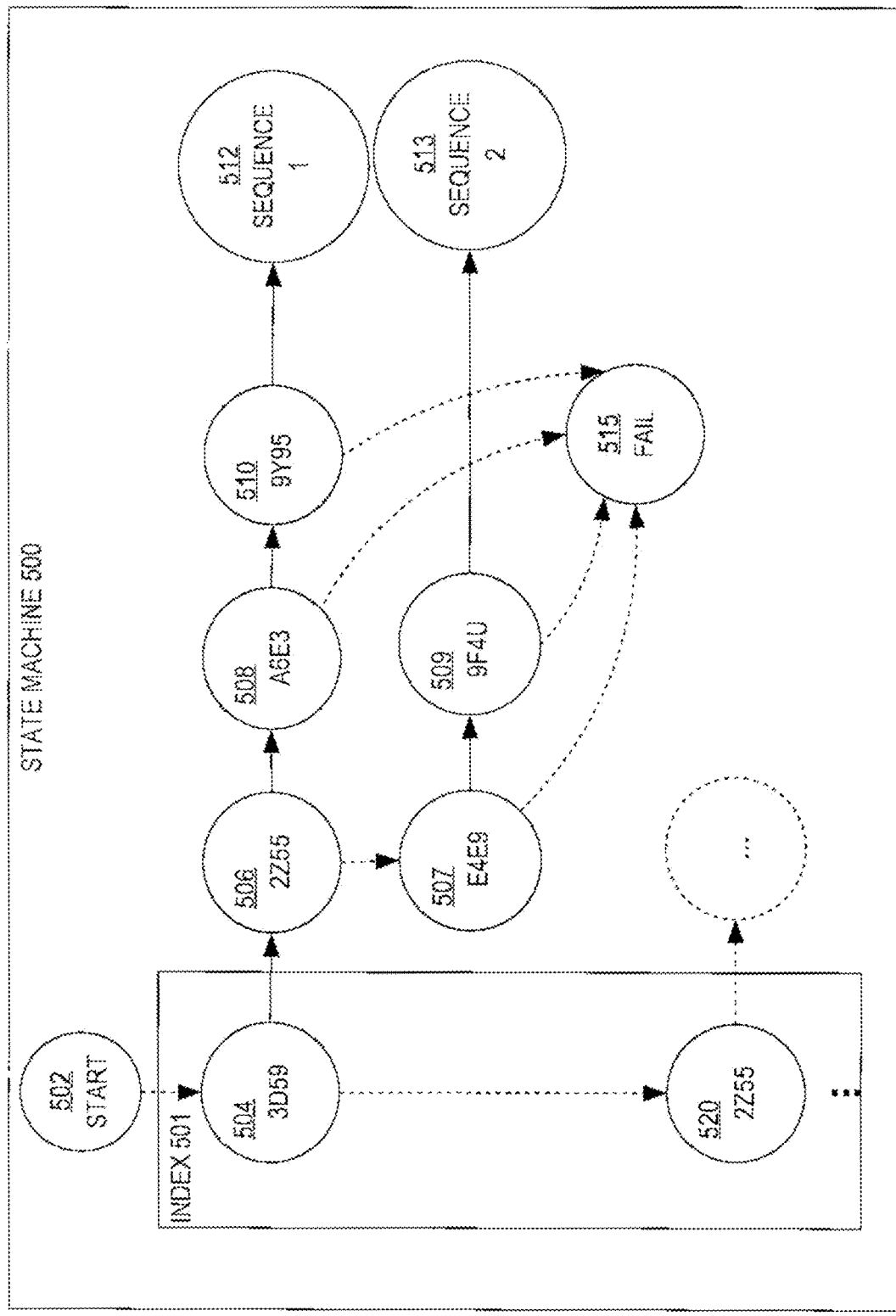
FIG. 5A is a block diagram illustrating a state machine for matching in-band data patterns according to an embodiment.

Referring now to FIG. 5A, according to one embodiment, hash value sequence data in the form of a pattern recognition state machine is shown. The hash value sequence data is represented by State Machine 510, which contains nodes representing individual hash values within the hash value sequences. According to one embodiment, State Machine 510 contains a START node 502, which represents the beginning state of the State Machine.

According to one embodiment, the nodes of State Machine 510 are indexed according to the first hash value of any hash sequence identified in the hash value sequence data. After the State Machine 510 initializes, it may first determine whether that hash value of the first node 504 matches a hash value generated by the Parsing Module 210. If no match occurs, State Machine 510 continues to traverse Index 501, subsequently testing the next node 520. Note that although rare, different hash value sequences may begin with the same hash value. Therefore, node 504, representing hash sequences that begin with the hash value "3D59", may contain two distinct branches representing different hash value sequences (1) 3D59, 2Z55, A6E3, and 9Y95, or (2) 3D59, 2Z55, E4E9, and 9F4U.

According to one embodiment, State Machine 500 is a lightweight component on DVR 200, meaning that State Machine 500 is designed to occupy minimal system resources during operation of DVR 200. Therefore, even in the case that State Machine 500 must traverse tens of thousands of nodes to determine if a hash value sequence has been recognized, few system resources are needed to operate State Machine 500. Hence, DVR users will not notice any delay or degradation in the playback of multimedia content during the operation of State Machine 500.

According to one embodiment, the efficiency of State Machine 500 is further advanced by the use of the Index 501. By indexing the first hash value within each hash sequence in an Index 501, State Machine 500 can quickly rule out a large amount of hash sequences for comparison without occupying many system resources.

In order to begin processing generated hash values from Parsing Module 210, State Machine 500 is initialized and begins testing the nodes located in Index 501. According to one embodiment, the first hash value generated by Parsing Module 210 is "3D59", corresponding to Text A in frame 310A of FIG. 3B. Accordingly, State Machine 500 is initiated, it will test the first node 504 representing the hash value "3D59" and find a match, giving a positive output. According to this embodiment, any match causes the state machine to proceed to the right while any failure causes the state machine to traverse to a lower level. However, in other embodiments, State Machine 500 may be structured in any manner suitable for testing hash values.

However, assume that a hash value of "2Z55" was initially reported by Parsing Module 210. Instead of finding a match at the first node 504, State Machine 510 would report a negative output and proceed down to the next node 520 in Index 501, representing the hash value "2Z55". Alternatively, if no match is found at a particular node, State Machine 510 may also proceed to the FAIL node 515, which causes the State Machine to reset and begin at START node 502 once again.

Therefore, assuming that a match occurred at the first node in Index 501, State Machine 212 then waits for the next generated hash value from the Parsing module 210. In one embodiment, the next generated hash value is "2Z55". Accordingly, State Machine 510 compares "2Z55" with the value in the next node 506. Because the value in the next node is also "2Z55", State Machine 510 will find a match and proceed to node 508. Note, however, that if no match was found at node 506, State Machine 500 would not proceed to the FAIL State, but instead attempt to match the hash value at node 507, representing "E4E9". In this manner, node 506 represents a fork in State Machine 500 such that two hash value sequences may start with the hash values of "3D59" and "2Z55", respectively.

In response to receiving hash values generated by Parsing Module 210, State Machine 500 sequentially traverses each node represented in FIG. 5 until no match occurs or until the end of a hash sequence has been identified. Further, while matching hash values to each hash value in the sequence of hash values, State Machine 500 may also compare the time offset between hash value generated by Parsing Module 210 and the hash value within the hash sequence. If both the hash values match and the time offset values of both hash values match, State Machine 500 can determine that a positive match has occurred. In another embodiment, State Machine 500 may determine that a particular hash value has matched the time offset of a hash value within the hash sequence by allowing a "buffer" or margin of error. According to this specific example, State Machine 500 determines that a match has occurred for the hash sequence of 3D59, 2Z55, A6E3, and 9Y95 after receiving the respective hash values generated by Parser 312 in FIG. 3B.

When no match is found, State Machine 500 resets to START node 502 and re-initializes the matching process when the next hash value is received from Parsing Module 210.

Note that throughout the operation of the DVR 200, the State Machine 500 is continuously attempting to match hash values with hash value sequences. When a positive match is made for a full hash sequence, at step 412, State Machine 500 reports a successful match, causing DVR 200 to inspect metadata associated with the hash value sequence data.

In other embodiments, State Machine 500 utilizes a hash table to attempt to match hash values with hash value sequence data. A hash table is a data structure made up of an array (or table where the data to be searched is stored) and a mapping function. A hash table is commonly used in search algorithms and is a data structure that is well known in the art.

Further, in another embodiment, DVR 200 contains a plurality of state machines. By having more than one state machine running at a time, multiple patterns within the same sequence of hash values may be identified. For instance, assume that the hash values of "X6Y6, A4Z4, and B1C1" were generated from a multimedia content stream. Also, assume that two known patterns exist, "X6Y6, A4Z4" and "A4Z4, B1C1." If a single state machine was running on DVR 200, only one of those patterns would be recognized. However, because DVR 200 may concurrently run more than one state machine, DVR 200 may recognize both patterns "X6Y6, A4Z4" and "A4Z4, B1C1." from the hash values of "X6Y6, A4Z4, and B1C1." Therefore, in other embodiments, DVR 200 may contain a plurality of state machines, and each state machine may represent different patterns of in-band data.

Referring to FIG. 5B, hash value sequence data is shown in accordance with one embodiment. The hash value sequence data contains Sequence Data 520A and Metadata 520B. Sequence Data 520A corresponds to the data representing the sequence of hash values as well as the approximate time difference between the occurrences of the hash values. Thus, as described above, State Machine 500 traverses the nodes as depicted in FIG. 5A until no match is found at a particular level or if the end of a hash sequence has been encountered. According to one embodiment, Pattern Recognition State Machine 212 determines that the sequence of hash values 3D59, 2Z55, A6E3, and 9Y95, has matched up with the generation of the same hash values from Parsing module 210 based on the time difference between each generated hash value.

3.1.4 Synchronizing to Closed Caption Data

When a DVR determines that a pattern match has occurred, it uses the metadata described above to synchronize to the multimedia content stream. In particular, the DVR uses the metadata to determine the relative location of events or video programs within the multimedia content stream. Thus, when DVR 102 determines that a particular sequence of hash values have been generated, DVR 200 will consult Metadata 520B to determine the action that will be taken. Metadata 520B may contain information such as command and control information, program timing, content information, display instructions and graphic information. Further, Metadata 520B may also contain Command Data 522.

Once the Pattern Recognition State Machines 212 have determined that the hash values from the multimedia content stream match a particular hash sequence, then at step 412, the DVR inspects hash sequence metadata associated with the hash sequence and responds accordingly. Depending on the content of the metadata, A DVR such as DVR 102 can respond in many different ways to recognizing a sequence of hash values. For instance, the metadata may contain information allowing the DVR to recognize events within a video program, synchronize to the video program or entire multimedia content stream, display information to a user or cause a future program to be recorded. Further, in other embodiments, the metadata may contain information enabling the DVR to perform any action relative to the multimedia content stream, video program or DVR operation, e.g. skipping commercials and other content.

Thus, referring now to FIG. 6, a block diagram illustrating a method for synchronizing actions and events to in-band data is shown according to one embodiment. Table 606 represents hash value sequence data while Table 608 represents metadata associated with the particular hash sequence. In this particular example, Table 606 holds the hash sequence of 3D59, 2Z55, A6E3, and 9Y95, as well as the time and time offset values for each hash value. As described above, this information is received from Server 106A or any other source, and is located on DVR 102 in the form of Pattern Recognition State Machines 212. Content 600 represents a multimedia content stream containing one or more video programs. While playing through or recording multimedia content stream 600, DVR indicates its playback location within Content Stream 600 using the slider 604 that moves across a program cache bar representing the program material as described in U.S. Pat. No. 6,850,691 and U.S. application Ser. No. 10/915,990, both entitled "Multimedia Progress Indication System", and owned by the Applicant, and both of which are fully incorporated by reference herein. In this particular example, slider 604 is currently at time 1:12 of the multimedia content stream or video program. While playing through the Content Stream 600, using a parsing module, the DVR generates hash value "3D59" at time :00, hash value "2Z55" at time :05, hash value "A6E3" at time :10 and hash value "9Y95" at time :12, which is currently at the location indicated by the slider 604.

With the hash values and corresponding time data generated, DVR determines that the hash values match the hash value sequence data located in Table 606. According to one embodiment, DVR can positively match the hash values to the hash value sequence data by comparing not only the actual hash values but also the time offsets for each hash value.

After determining a match, the DVR now knows where it is located within the program. Specifically, the DVR determines that slider 604 is located 12 seconds after the beginning of the specified beginning of the program according to the hash value sequence data. Next, the DVR examines the metadata information located in Table 608 to determine the appropriate action to take in response to matching the hash value sequence data. According to one embodiment, Table 608 indicates that EVENT 1 takes place at time :10. By examining the current location of slider 604, DVR 102 can calculate that EVENT 1 takes place :02 seconds before the current location of the slider. If EVENT 1 were defined to be displaying an icon to the user for 10 seconds, the DVR 102 can immediately display the icon for eight seconds since it knows that it has already passed the start of the EVENT 1 by two seconds. If the program being played is a recording or the user is playing a live broadcast but his playback location is lagging behind the actual broadcast, the DVR 102 can scan ahead of the current playback location and calculate hash values ahead of the current playback location. This allows the DVR 102 to be more accurate in the actuation of any actions associated with an event.

Further, after inspecting Table 608, DVR 102 can determine that EVENT 2 will take place at time :40 of the video program. After examining the current location within the video program, DVR 102 determines that EVENT 2 takes place :28 seconds after the last hash. Because DVR 102 can determine the precise location of EVENTS 1 and 2 within the multimedia content stream, DVR 102 may be programmed to react to those events in any manner. For instance, according to one embodiment, DVR 102 may be instructed to display an icon to a user during EVENT 2. In another embodiment, DVR 102 may be programmed to begin recording the multimedia content stream at EVENT 2. In this manner, the information identifying any EVENT 1 or 2 may be used to identify a distinct event within video program 600. Further, in other embodiments, Table 608 may define other events or actions for a DVR to take upon recognition of a hash sequence. For instance, after recognizing the hash sequence 3D59, 2Z55, A6E3, and 9Y95, table 608 may indicate that DVR is to immediately display an interactive icon on a display device to the user.

Further, once DVR 102 recognizes EVENTS 1 and 2 within the video program, DVR 102 may insert video tags into the multimedia content stream at the locations of EVENT 1 and 2. According to one embodiment, video tags are data objects interleaved into a multimedia content stream containing video and audio data, such as an MPEG-2 stream. After the video tags are placed into the multimedia content stream, the multimedia content stream is stored for later playback. When played back, DVR 102 processes the multimedia content stream and encounters the video tags at the exact location of EVENTS 1 and 2. In this manner, once video tags have been placed into the multimedia content stream, the DVR no longer needs to recognize closed-caption data in order to synchronize to the multimedia content stream because the events or actions have been defined by the video tags, which are automatically processed along with the video and audio data during playback. Video tags are discussed in further detail in U.S. application Ser. No. 09/665,921, entitled "Closed-Caption Tagging System," owned by the Applicant and fully incorporated by reference herein.

Although the above process has been described in relation to DVR 102, the method may be performed by any other device capable of performing such steps, such as DVR 104, PC 101A or Portable Device 101B.

3.2 Enhanced Television Signaling Data

Another type of in-band data which can be used for recognizing in-band data patterns is Enhanced Television (ETV) signaling data. ETV enables the use of interactive applications to be delivered "in-band" with other video services in a multimedia content stream. In order to synchronize the in-band applications with video programs, ETV utilizes command signals coordinated against the timing of video programs. More information regarding signaling capabilities for in-band transmission of data is available in the OpenCable Enhanced TV Application Messaging Specification (ETV-AM-I02) which specifies signaling capabilities for in-band transmission of data synchronized with the time line of a video service.

According to one embodiment, ETV capable multimedia devices include an ETV agent for receiving and processing ETV command signals. ETV command signals cause multimedia devices to discover, download, launch and terminate ETV applications at particular times. Thus, according to one embodiment a multimedia device may recognize patterns of ETV signaling data which define the beginning or ending of applications within an ETV multimedia content stream. This may be implemented by using Parsing Module 210 to identify and extract the ETV signaling data from the multimedia content stream. Further, the ETV command signals may include additional information, such as information describing the ETV content or programming. Additionally, the ETV command signals are associated with time data for processing the ETV application at the correct time. Using this time data, a multimedia device may identify a relative position within a multimedia content stream. Therefore, a multimedia device can interpret ETV signaling data to determine that (a) an ETV event is occurring and (b) that the ETV event is synchronized with a particular portion or segment of the video program.

Thus, similar to recognizing hash value sequences in closed-caption data, the Pattern Recognition State Machine 212 may be used to recognize patterns of ETV command signals and timing information. Because ETV applications are already synchronized to the accompanying video program, a multimedia device may synchronize to a multimedia content stream by recognizing patterns of ETV signaling data. As with closed-caption data, once the multimedia device recognizes a pattern, the multimedia device may take actions similar to those described above with respect to synchronizing actions and events to closed-caption data.

4.0 Approach for Creating and Viewing Customized Multimedia Segments 4.1 User Selection of Multimedia Program Segments According to one embodiment, video programs in a multimedia content stream are displayed to a DVR user at a display device such as a television screen or computer monitor. In other embodiments, video programs may be displayed on a display device such as a portable multimedia viewing device. A DVR user can control the playback of the video program using a control interface such as a remote control.

A user can mark off sections of a multimedia program or place points of interest relating to content within the multimedia program. For example, a user may want to mark the best plays of a recording of a football game. Once the user marks the plays, he can send the resulting hash sequences to a friend's DVR. One method of transferring data between DVRs is described in U.S. application Ser. No. 10/220,558, entitled "System and Method for Internet Access to a Personal Television Service" and U.S. application Ser. No. 10/741,596, entitled "Secure Multimedia Transfer System", both owned by the Applicant, and both fully incorporated by reference herein. The friend's DVR can then display the user's points of interest to the friend when the friend plays his recorded copy of the game. The friend's DVR displays the points of interest along the program cache bar, for example, displayed on his display device.

The friend's DVR pre-processes the recorded game before it begins to playback the game by calculating hash values of the recorded game and comparing the hash values to the received hash sequences. This enables the DVR to locate the points of interest in the recorded game and to display the points of interest to the friend. The friend can then skip to the points of interest using his remote control.

DVR users can distribute their own sets of points of interest for programs to other users. Users can further attach metadata to each point of interest that may cause the DVR to display text to the viewer, e.g., "Isn't this a great action scene?" The user may also attach metadata to a point of interest that tells the DVR to skip x seconds into the program from that point of interest or display x seconds of the program before skipping to the next point of interest. This allows users to create their own condensed versions of a program that they can distribute to their friends, family, classmates, students, interest group, etc.

Also, a DVR may be instructed to re-arrange segments of a multimedia program or of an entire content stream. One purpose for doing so is when the broadcaster has scrambled segments of the multimedia content stream. As a result, unauthorized viewers will not be able to view the multimedia content stream clearly. However, for authorized viewers, the DVR arranges the segments in the correct order. Further, users may wish to re-arrange segments of the multimedia content stream to create their own customized multimedia programs. Users may then store customized multimedia programs or distribute customized multimedia programs to their friends and other DVR users. The customized multimedia programs may include a compilation of segments retrieved from different multimedia content streams, or segments that have been previously stored on the DVR's storage device.

Using the method for recognizing and synchronizing a computer system to in-band data as described above, the DVR can easily perform these functions.

For example, when a user desires to save or indicate the location of particular content within the video program, the DVR user can depress a button on the control interface to indicate so. The control interface sends a signal to the DVR, which interprets the signal as a user-selection. The DVR can then determine the time within the program that the user has sent the signal from the control interface and calculate an in-band data pattern that leads up to that point.

4.2 Creating User-Initiated Event Identification Data for Multimedia Programs

Referring to FIG. 7, a block diagram illustrating a method for creating and viewing multimedia segments within a video program is shown according to one embodiment. When a multimedia content stream 700A containing in-band data such as Closed Captioning (CC) Data 702 is being recorded or played back at a DVR or other device, time information in the form of timestamps is associated with the in-band data. Specifically, as described above, the multimedia content stream, including the in-band data is packetized into discrete audio, video and data frames. When packetized, each frame is given a relative time stamp. These timestamps may be used to track the time of in-band data within the multimedia content stream or video program.

When a user views a segment of a video program that he/she would like to save or take note of, the user causes DVR 102 to mark the segment by selecting a location within the video program. According to one embodiment, a graphical user interface is presented on a display screen including a program cache bar 700B and a slider 708. The slider indicates the current playback location of the program. When a user would like to select a location within the video program, the user waits until the slider has reached the desired location and, using a control interface such as a remote control, selects the desired location. When the user depresses a button on the remote control, a signal is sent from the remote control to the DVR, causing the DVR to display a drop-down menu for the user. The drop down menu may contain options for the user to select in relation to the desired location in the video program. According to one embodiment, the options available to the user include book marking, skipping the location, attaching a note, or any other action that may be performed in relation to a video program.

According to one embodiment, while the video program is playing, a DVR user selects location 704 using the control interface. When the DVR receives the signal from the control interface, it recognizes that a user-selection has occurred and records the location of the selection, which occurs at time :10. At this point, the DVR creates event identification data. As described above, the event identification data may contain patterns or sequences of in-band data, as well as metadata for identifying actions or events within the multimedia content stream.

Again, one type of in-band data is closed-caption data. According to one embodiment, in order to create event identification data, the DVR searches for sufficient closed-caption data preceding location 704 for creating a unique sequence of hash values. Table 710 represents hash value sequence data of video segment 700. The hash value sequence data can indicate the hash value, time of the hash value, and a time offset for each hash value. According to one embodiment, the time offset indicates the difference in time between the generation of the hash value and the previous hash value in the video program.

Thus, table 710 identifies hash values "W5W4" and "M5M5" which precede location 704. The DVR records the time that each hash value was generated according to the particular closed-caption method used to display the closed-caption text and the time offset of hash values. Here, hash value "W5W4" occurs at time :06 from the beginning of the program and is the first hash in the sequence with a time offset of zero. Hash value "M5M5" occurs at time :08 from the beginning of the program and is two seconds after hash value "W5W4". When a DVR recognizes the hash sequence "W5W4, M5M5", the DVR may identify that an action is required just prior to the actual playback of location 704 and perform the appropriate action, such as the display of an icon. The metadata may indicate that two seconds after recognizing hash sequence "W5W4, M5M5", the icon should be displayed.

Further, the user may also select a second location 706, representing the end of a desired portion of a video segment which occurs at time :20. According to one embodiment, the DVR parses the CC data in between time :10 and :20, generates three hash values "Z1B1, E5Y5, and A2R2", and records the time that each hash value was generated. Hence, in this particular example hash value "Z1B1" occurs first (here, at time :12), hash value "E5Y5" occurs two seconds later, and hash value "A2R2" occurs four seconds after "E5Y5". Collectively, hash values "Z1B1, E5Y5, and A2R2" represent the hash sequence for the second location 706. The metadata associated with the program will indicate this.

Thus, in table 710, hash value "Z1B1" occurs at time zero since it is the first hash in the sequence, hash value "E5Y5" occurs two seconds after hash value "Z1B1", and hash value "A2R2" occurs four seconds after hash value "E5Y5". Alternatively, the time offset may be relative to any portion of the video program, multimedia content stream, location in the video program or stream, or video segment.

When a DVR plays the multimedia content stream 700B using table 710 as hash value sequence data for its state machine, it parses the CC Data 702 and generates hash values. Once the DVR recognizes hash value "A2R2", according to the method described above for recognizing hash sequences, DVR can immediately perform an action, such as causing the display of an icon at a display screen connected to the DVR. In this case, when the DVR recognizes the hash sequences located in Table 710, the DVR can determine the exact start and end times of the video segment between location 704 and 706. Given this information, the metadata associated with the hash value sequence data may instruct the DVR to skip the program segment between location 704 and 706 or may instruct the DVR to store the program segment between location 704 and 706, for example.

The DVR can recognize video segments relative to any multimedia content stream by using the timestamps in the hash value sequence data. Hence, even if a video program were broadcast or played back at two different times in different locations, the same video segments could be recognized using the timestamps associated with the hash values. More specifically, the timestamps are relative to the generation of hash values, and not to a local time of the DVR or broadcast time. Therefore, assuming that most programming will be identical when played back in different locations or at different times, video segments can be recognized with great accuracy using the timestamps of hash values. Note that although the discussion above focuses on closed-caption data, the invention is not limited to such an embodiment, and a DVR may create event identification data using any type of in-band data such as ETV signaling data.

4.3 Creating Tagged Multimedia Program Content

After recognizing events or segments within a video program, DVR 102 can generate tags to correspond to the segment or events and insert those tags into the multimedia content stream at the appropriate locations. Each tag may contain command and control information that a device processing the tag translates and acts upon. For instance, according to one embodiment, if a user wishes to skip all content between locations 704 and 706, after recognizing the hash sequence associated with the video segment, the DVR may simply create a tag at location 704 causing the DVR to automatically jump 10 seconds to location 706, thereby skipping the video segment.

Further, the tag data is processed as part of the multimedia content stream and is therefore automatically synchronized with the playback of the video program. With the tag data, a device receiving the multimedia content stream can automatically skip to the selected location. Alternatively, the tag may include information identifying the content relating to the location within the video program. For instance, a tag corresponding to location 704 in multimedia content stream 700A may include information identifying the location as an intermission within a sports program. Further, location 706 may be the end of the intermission. Thus, a DVR can present a user-interface for a user indicating that the intermission within the sports program takes place at location 704 or time :10 and ends at location 706 or time :20. Using this information, the user can cause the DVR to skip past location 704 and proceed directly to location 706.

Also, while inserting tags into the multimedia content stream to correspond to particular events or segments, DVR 102 can remove the in-band data from the multimedia content stream. For example, according to one embodiment, the multimedia content stream is an MPEG 2 transport stream including separate audio, video and data feeds. The original in-band data is located in the data portion of the multimedia content stream. When a tag is generated, the tag is inserted into the data portion of the multimedia stream. Further, once the in-band data has been removed, for example, PC 101 can transfer the multimedia content stream to Portable Device 101B. Because tags have been placed into the multimedia content stream and the closed captioning stream has been removed, Portable Device 101B does not need to display closed caption data. Instead, the tags within the multimedia content stream are automatically processed in synchronization with the multimedia content stream while the multimedia content stream is being displayed to a user. Further details about generating and inserting tags into multimedia content stream is set forth in U.S. application Ser. No. 09/665,921 entitled "Closed Caption Tagging System", owned by the Applicant and fully incorporated by reference herein.

In another embodiment, a multimedia device such as DVR 102 or PC 101 may simply provide a list of interesting locations to Portable Device 101B. Thus, instead of inserting tags into the multimedia content stream, the content stream is untouched, and the Portable Device 101B can identify events within a video program using the list of interesting locations. The list of interesting locations may be provided separately from the multimedia content stream to Portable Device 101B. According to one embodiment, the list of interesting locations includes time data identifying the relative time at which an event occurs. Further, the list of interesting locations may also include additional data, such as data describing each event. Portable Device 101B can decide to use the data in the list of interesting locations in any appropriate manner.

According to one embodiment, the list of interesting locations is generated by a multimedia device in response to user input. For example, a user may select one or more locations within a video program using a control interface. The multimedia device receives signals from the control interface and determines where the selected locations are within the video program. The multimedia device can make such a determination by examining time data associated with the multimedia content stream. The multimedia device then stores data identifying each selected location with its associated time data in the list of interesting locations and provides the list to Portable Device 101B.

Further, in another embodiment, a multimedia device can generate a list of interesting locations after recognizing events or segments within a video program using in-band data patterns. For example, a multimedia device may process an entire multimedia content stream before providing it to a Portable Device 101B. When the multimedia device recognizes an in-band data pattern, it examines the metadata associated with the in-band data pattern and identifies events within a video program, including time data associated with each event. Using the time data, the multimedia device generates a list of interesting locations listing each event and the time that the event takes place relative to the video program or multimedia content stream. The list of interesting locations is then provided to Portable Device 101B, which can use the list to identify the locations within the video program.

4.4 Sharing Event Identification Data for Multimedia Content

As noted above, DVR users may transfer event identification data from their DVR to other DVRs. This can be accomplished via direct transfer across a network or Internet to another DVR. Once a DVR receives event identification data, the DVR user may be notified that a customized program index has been received and also notified which program it relates to. The user may then choose to play the program using the index.

Further, a DVR service can act as a distribution point for event identification data. Event identification data associated with a program may be uploaded to Server 106A from the DVR. When Server 106A receives the event identification data from the DVR, it stores the event identification data at a local storage device or database. Server 106A may provide event identification data created at multiple DVRs for download via Network 105. When another DVR 104 wants to retrieve event identification data associated with a particular program, Server 106A sends the event identification data to DVR 104 over Network 105. Hence, a system for creating and viewing customized video segments is enabled.

5.0 Implementation Mechanisms

Figure 8:
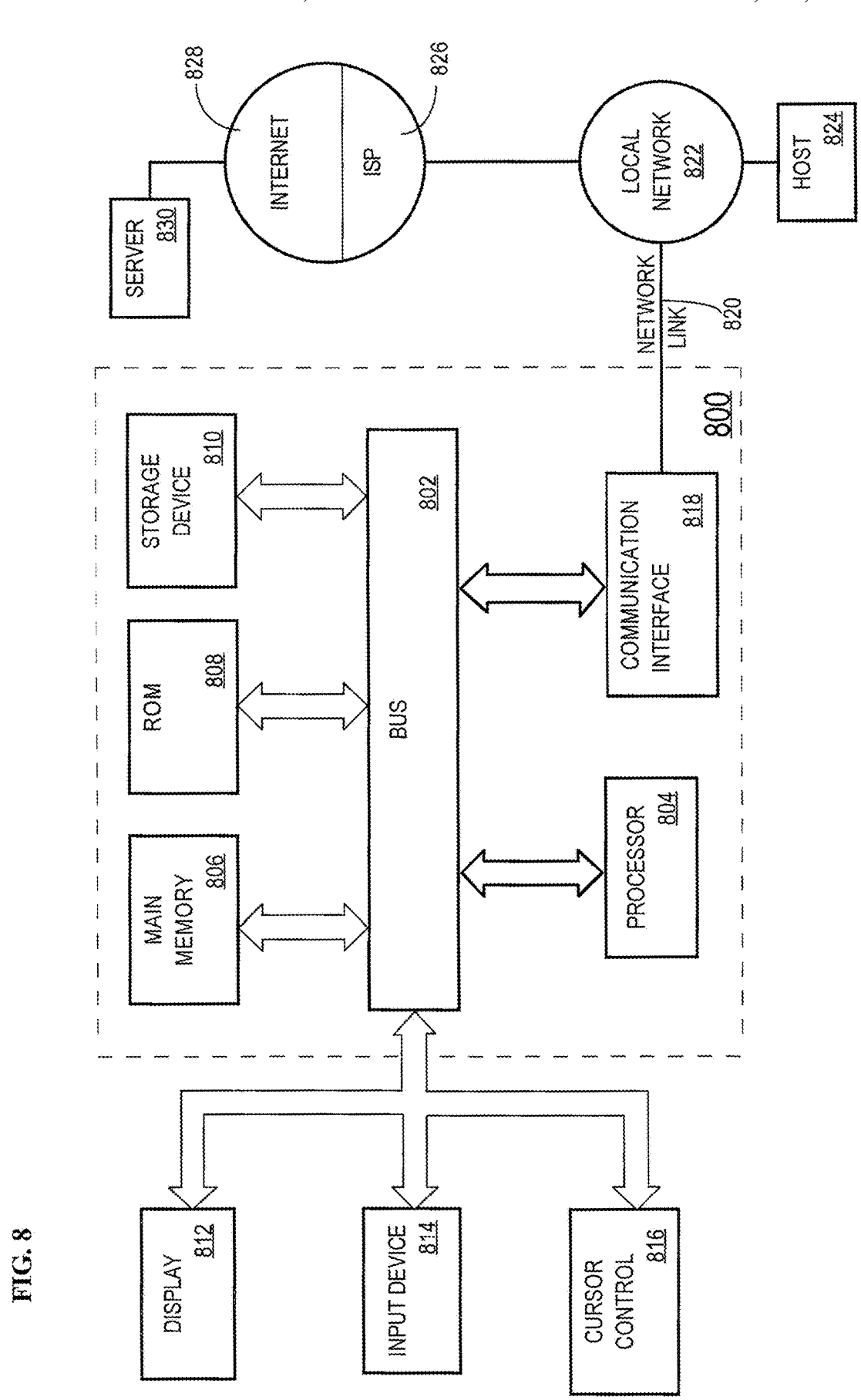
FIG. 8 is a block diagram of a system on which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822.

For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the Applicant to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving user input specifying a location in a multimedia content stream displayed on a first multimedia device;
    receiving a user instruction for performing an action on the specified location;
    determining event identification data by searching for preceding data that precedes the specified location in the multimedia content stream, wherein the preceding data is sufficient to generate a unique sequence;
    determining a timing offset of the specified location from the preceding data;
    inserting the event identification data and the unique sequence into the multimedia content stream; and
    in response to recognizing the preceding data, initiating, prior to reaching the specified location, an operation for the performing of the action.

2. The method of claim 1, wherein the receiving the user instruction is in response to presenting a user input option associated with the multimedia content stream.

3. The method of claim 2, wherein the user input option comprises at least one of bookmarking, skipping over a segment in the multimedia content stream, or attaching a note.

4. The method of claim 3, wherein the segment corresponds to one or more commercials.

5. The method of claim 1, further comprising:
    subsequent to inserting the event identification data into the multimedia content stream, sending the multimedia content stream to a second multimedia device that is different from the first multimedia device.

6. The method of claim 5, further comprising:
    causing the multimedia content stream to be displayed on the second multimedia device; and
    causing the second multimedia device to perform the action based on the event identification data.

7. The method of claim 1, wherein the event identification data comprises at least one of patterns, sequences of in-band data, or metadata for identifying the action associated with the specified location in the multimedia content stream.

8. The method of claim 7, wherein the in-band data is closed-caption data.

9. The method of claim 1, further comprising:
    generating an index of the event identification data, the index comprising hash value sequence data indicating a hash value that is the generated unique data sequence, a time of the hash value, and a time offset for the hash value.

10. The method of claim 9, wherein the searching for the data preceding the location in the multimedia content stream comprises searching closed-caption data.

11. The method of claim 1, wherein the unique sequence is a hash of the preceding data.

12. The method of claim 1, wherein the action is generating a display of an icon during play of the multimedia content stream.

13. The method of claim 1, wherein the action is generating a display during play of the multimedia content stream, and the generating of the user display is started prior to the specified location being reached in the play of the multimedia content stream.

14. A system comprising:
    a memory configured to store an action associated with a multimedia content stream;
    control circuitry configured to:
        receive user input specifying a location in the multimedia content stream displayed on a first multimedia device;
        receive a user instruction for performing the action on the specified location and store the action in the memory;
        determine event identification data by searching for preceding data that precedes the location in the multimedia content stream sufficient to generate a unique sequence;
        determine a timing offset of the specified location from the preceding data; and
        in response to recognizing the preceding data, initiate, prior to reaching the specified location, an operation for the performing of the action.

15. The system of claim 14, wherein the receiving of the user instruction is in response to presenting a user input option associated with the multimedia content stream, and wherein the action comprises at least one of bookmarking a segment of the multimedia content stream, skipping over a segment of the multimedia content stream, or attaching a note to a segment of the multimedia content stream.

16. The system of claim 14, wherein the specified location marks a segment of the multimedia content stream corresponding to one or more commercials.

17. The system of claim 14, wherein the control circuitry is further configured to:
  subsequent to inserting the event identification data into the multimedia content stream, send the multimedia content stream to a second multimedia device that is different from the first multimedia device,
  cause the multimedia content stream to be displayed on the second multimedia device; and
  cause the second multimedia device to perform the action based on the event identification data.

18. The system of claim 14, wherein the event identification data comprises a sequence of in-band data, and the in-band data is closed-caption data.

19. The system of claim 14, wherein the control circuitry is further configured to:
  generate an index of the event identification data, the index comprising hash value sequence data indicating a hash value, a time of the hash value, and a time offset for the hash value.

20. The system of claim 19, wherein the searching for the data preceding the location in the multimedia content stream comprises searching closed-caption data.

* * * * *